US008392952B2

(12) United States Patent
Carlucci et al.

(10) Patent No.: US 8,392,952 B2
(45) Date of Patent: Mar. 5, 2013

(54) PROGRAMMING CONTENT PROCESSING AND MANAGEMENT SYSTEM AND METHOD

(75) Inventors: John B. Carlucci, Boulder, CO (US); Louis D. Williamson, Denver, CO (US); Jon C. Honhart, Arvada, CO (US)

(73) Assignee: Time Warner Cable Enterprises LLC, New York, NY (US)

( * ) Notice: Subject to any disclaimer, the term of this patent is extended or adjusted under 35 U.S.C. 154(b) by 1261 days.

(21) Appl. No.: 10/860,969

(22) Filed: Jun. 2, 2004

(65) Prior Publication Data

US 2004/0244058 A1    Dec. 2, 2004

Related U.S. Application Data

(63) Continuation-in-part of application No. 10/428,719, filed on May 1, 2003, which is a continuation-in-part of application No. 10/263,015, filed on Oct. 2, 2002, now Pat. No. 7,908,626.

(60) Provisional application No. 60/377,963, filed on May 3, 2002.

(51) Int. Cl.
*H04N 7/16* (2006.01)
*H04N 7/173* (2006.01)
*H04N 11/04* (2006.01)

(52) U.S. Cl. ................ 725/62; 725/91; 725/92; 725/93; 375/240.12

(58) Field of Classification Search .................... 725/31, 725/32, 34–36, 114–116, 143–146, 62, 91–93; 380/234; 375/240.12; 386/68
See application file for complete search history.

(56) References Cited

U.S. PATENT DOCUMENTS 4,476,488 A    10/1984    Merrell
(Continued)

FOREIGN PATENT DOCUMENTS

WO    WO 01/56285 A1    8/2001

OTHER PUBLICATIONS

Roy Furchgott, "Don't people want to control their T.V.s?", The New York Times, Aug. 24, 2000, Section G, p. 1, col. 2, Circuits, 2000 The New York Times Company.

(Continued)

*Primary Examiner* — Pankaj Kumar
*Assistant Examiner* — Franklin Andramuno
(74) *Attorney, Agent, or Firm* — Cozen O'Connor; Brandon N. Sklar

(57) ABSTRACT

In accordance with aspects of the present invention, a technique is implemented to effectively receive streaming multimedia content in digital form, parse and segment the received transport stream and process the segmented content. Such treatment of received programming content provides for efficient storage of such programming content, and effectively provides for access to such content by administrators of a broadband system as well as users of such systems. In accordance with the invention, a technique enables, among other things: the creation of reference frames for, e.g., effective segmentation of programming content; encapsulation of programming content data as a UDP/IP datagram; associating programming content with provider and dedicated resource attributes; monitoring staging processor activity; effectively segmenting programming content that is scrambled; developing a unicast and multicast; compensating for missing or delayed programming content; and propagating video servers of varying manufacturers.

39 Claims, 10 Drawing Sheets

U.S. PATENT DOCUMENTS

| | | | | |
|---|---|---|---|---|
| 5,253,066 | A | 10/1993 | Vogel | |
| 5,335,277 | A | 8/1994 | Harvey et al. | |
| 5,357,276 | A | 10/1994 | Banker et al. | |
| 5,371,551 | A | 12/1994 | Logan et al. | |
| 5,377,051 | A | 12/1994 | Lane et al. | |
| 5,436,917 | A | 7/1995 | Karasawa | |
| 5,479,303 | A | 12/1995 | Suzuki et al. | |
| 5,543,927 | A | 8/1996 | Herz | |
| 5,550,640 | A | 8/1996 | Tsuboi et al. | |
| 5,559,549 | A | 9/1996 | Hendricks et al. | |
| 5,568,200 | A * | 10/1996 | Pearlstein et al. | 375/240.27 |
| 5,579,183 | A | 11/1996 | Van Gestel et al. | |
| 5,606,359 | A | 2/1997 | Youden et al. | |
| 5,625,406 | A | 4/1997 | Newberry et al. | |
| 5,659,350 | A | 8/1997 | Hendricks et al. | |
| 5,671,386 | A | 9/1997 | Blair et al. | |
| 5,687,275 | A | 11/1997 | Lane et al. | |
| 5,699,360 | A | 12/1997 | Nishida et al. | |
| 5,727,113 | A | 3/1998 | Shimoda | |
| 5,729,648 | A | 3/1998 | Boyce et al. | |
| 5,748,254 | A | 5/1998 | Harrison et al. | |
| 5,771,335 | A | 6/1998 | Lee | |
| 5,799,128 | A * | 8/1998 | Van Den Enden | 386/68 |
| 5,805,762 | A | 9/1998 | Boyce et al. | |
| 5,805,763 | A | 9/1998 | Lawler et al. | |
| 5,822,018 | A | 10/1998 | Farmer | |
| 5,822,493 | A | 10/1998 | Uehara et al. | |
| 5,850,218 | A | 12/1998 | LaJoie et al. | |
| 5,915,068 | A | 6/1999 | Levine | |
| 5,933,498 | A | 8/1999 | Schneck et al. | |
| 5,982,436 | A * | 11/1999 | Balakrishnan et al. | 375/240.05 |
| 6,005,603 | A | 12/1999 | Flavin | |
| 6,046,760 | A | 4/2000 | Jun | |
| 6,052,588 | A | 4/2000 | Mo et al. | |
| 6,055,358 | A | 4/2000 | Traxlmayr | |
| 6,065,050 | A | 5/2000 | DeMoney | |
| 6,108,002 | A | 8/2000 | Ishizaki | |
| 6,115,532 | A | 9/2000 | Saeki | |
| 6,118,922 | A | 9/2000 | Van Gestel et al. | |
| 6,172,712 | B1 | 1/2001 | Beard | |
| 6,177,931 | B1 | 1/2001 | Alexander et al. | |
| 6,233,389 | B1 | 5/2001 | Barton et al. | |
| 6,259,736 | B1 * | 7/2001 | Chujoh et al. | 375/240.13 |
| 6,314,572 | B1 | 11/2001 | LaRocca et al. | |
| 6,324,338 | B1 | 11/2001 | Wood et al. | |
| 6,327,275 | B1 | 12/2001 | Gardner et al. | |
| 6,351,596 | B1 | 2/2002 | Ostrover | |
| 6,370,319 | B1 | 4/2002 | Matsumoto et al. | |
| 6,378,130 | B1 | 4/2002 | Adams | |
| 6,389,218 | B2 | 5/2002 | Gordon et al. | |
| 6,442,328 | B1 | 8/2002 | Elliott et al. | |
| 6,445,738 | B1 | 9/2002 | Zdepski et al. | |
| 6,510,554 | B1 | 1/2003 | Gordon et al. | |
| 6,515,680 | B1 | 2/2003 | Hendricks et al. | |
| 6,549,718 | B1 | 4/2003 | Grooters et al. | |
| 6,603,488 | B2 * | 8/2003 | Humpleman et al. | 715/771 |
| 6,603,739 | B1 * | 8/2003 | Dubuc | 370/232 |
| 6,721,794 | B2 | 4/2004 | Taylor et al. | |
| 6,771,317 | B2 | 8/2004 | Ellis et al. | |
| 6,853,728 | B1 | 2/2005 | Kahn et al. | |
| 6,938,268 | B1 | 8/2005 | Hodge | |
| 6,965,724 | B1 | 11/2005 | Boccon-Gibod et al. | |
| 6,980,594 | B2 * | 12/2005 | Wang et al. | 375/240.12 |
| 7,024,678 | B2 | 4/2006 | Gordon et al. | |
| 7,096,488 | B1 * | 8/2006 | Zhang et al. | 725/105 |
| 7,113,542 | B2 * | 9/2006 | Tanaka | 375/240.01 |
| 7,536,705 | B1 * | 5/2009 | Boucher et al. | 725/112 |
| 7,614,066 | B2 | 11/2009 | Urdang et al. | |
| 2002/0016970 | A1 | 2/2002 | Negishi et al. | |
| 2002/0042924 | A1 | 4/2002 | Adams | |
| 2002/0059621 | A1 | 5/2002 | Thomas et al. | |
| 2002/0075402 | A1 | 6/2002 | Robson et al. | |
| 2002/0104093 | A1 | 8/2002 | Buehl et al. | |
| 2002/0107909 | A1 * | 8/2002 | Eyer et al. | 709/203 |
| 2002/0107940 | A1 | 8/2002 | Brassil | |
| 2002/0138831 | A1 | 9/2002 | Wachtfogel et al. | |
| 2002/0174438 | A1 | 11/2002 | Cleary et al. | |
| 2002/0191959 | A1 * | 12/2002 | Lin et al. | 386/68 |
| 2003/0007092 | A1 | 1/2003 | Sonner et al. | |
| 2003/0028882 | A1 | 2/2003 | Davis et al. | |
| 2003/0048671 | A1 | 3/2003 | Yoshikawa et al. | |
| 2003/0093800 | A1 | 5/2003 | Demas et al. | |
| 2003/0118243 | A1 | 6/2003 | Sezer et al. | |
| 2003/0149988 | A1 | 8/2003 | Ellis et al. | |
| 2003/0159151 | A1 | 8/2003 | Ikeda | |
| 2003/0172376 | A1 | 9/2003 | Coffin, III | |
| 2003/0208767 | A1 | 11/2003 | Williamson et al. | |
| 2004/0015999 | A1 | 1/2004 | Carlucci et al. | |
| 2004/0040035 | A1 | 2/2004 | Carlucci et al. | |
| 2004/0078817 | A1 | 4/2004 | Horowitz et al. | |
| 2006/0269060 | A1 * | 11/2006 | Candelore et al. | 380/239 |

OTHER PUBLICATIONS

"PVR copyright concerns raised", Audio Week, Aug. 23, 1999, section: This Week's News, 1999 Warren Publishing, Inc.

Dale Buss, "Ultra TV", Brandmarketing, Sep. 1999, vol. VI, No. 9, p. 74, ISSN 1091-6962, Fairchild Publications.

Brian Lowry, "Television, as you like it; Today's gadgetry is smart enough to let viewers choose camera angles, or kick back and rewind as the action unfolds live. Watch it, and it watches back" Los Angeles Times, Feb. 13, 2000, section: Calendar, p. 8, Calendar Desk, 2000 Times Mirror Company.

Christopher Grimes and Peter Thal Larsen, "Inside Track: TV viewers can box clever: Technology Video Recorders: personal video recorders will be a godsend for viewers. But what about the schedulers", Financial Times London Ed., Jun. 23, 2000, p. 18, ISSN 0307-1766.

Patricia Sabga; Charles Molineaux, "TiVo—CEO, CNNfn", transcript # 00090110FN-107 interview Michael Ramsay, The N.E.W. Show, Sep. 1, 2000, Fri. 5:18 p.m. EST, 2000 Cable News Network.

Mary Kathleen Flynn; Steve Young, "Interactive TV, CNNFn", transcript #00081407FN-111 interview Josh Bernoff, Digital Jam, Aug. 14, 2000, Mon. 8:08 p.m. EST, 2000 Cable News Network.

"More 'convergence' digital video recorders emerge", Video Week, Jun. 19, 2000, section: This Week's News, 2000 Warren Publishing, Inc.

"TiVo and replay sign cable deals to boost PVR distribution", Warren's Cable Regulation Monitor, Aug. 21, 2000, section: This Week's News, 2000 Warren Publishing, Inc.

"Future VOD role of studios vs. other companies debated", Video Week, Apr. 10, 2000, section: This Week's News, 2000 Warren Publishing, Inc.

Raymond Snoddy, "The TiVo—T.V.'s nemesis?", Times Newspapers Ltd., Sep. 1, 2000, section: Features, 2000 Times Newspapers Limited (the Times London).

Marc Gunther; Irene Gashurov, "When technology attacks!; Your T.V. is looking weird Network executives are getting flustered. Viewing choices are exploding. That's what happens . . . ", Fortune, Mar. 6, 2000, section: Features/Television, p. 152, 2000 Time Inc.

"Independent study shows TiVo service increases enjoyment and changes people's attitudes towards. T.V.", PR Newswire, May 2, 2000, 2000 FT Asia Intelligence Wire; 2000 PR Newswire.

Society of Cable Telecommunications Engineers, "Digital Program Insertion Cueing Message for Cable," ANSI/SCTE 35, Dec. 14, 2001.

Consumer Electronics Association, "CEA Standard, Line 21 Data Services," CEA-608-B, Oct. 2000.

Society of Cable Telecommunication Engineers, "Digital Program Insertion Cueing Message for Cable," SCTE/DVS 253, Sep. 27, 1999.

* cited by examiner

10

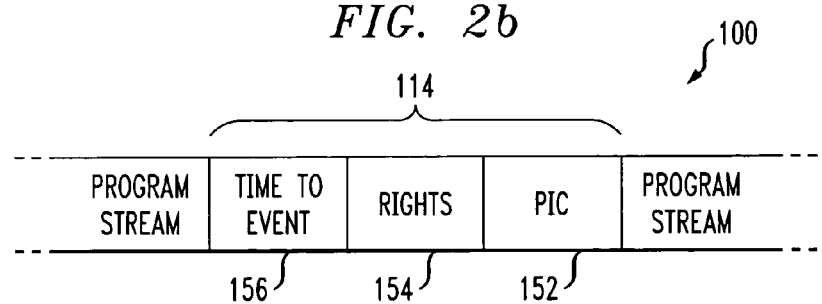
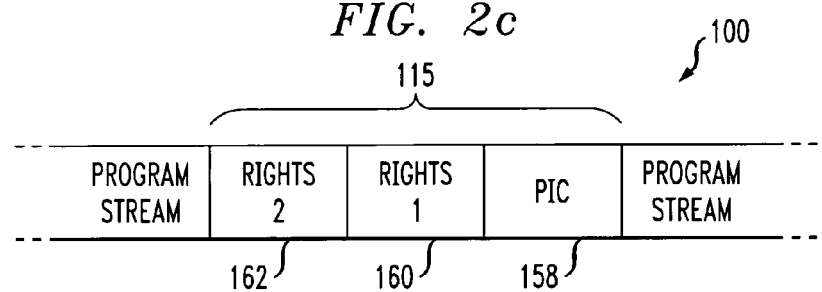
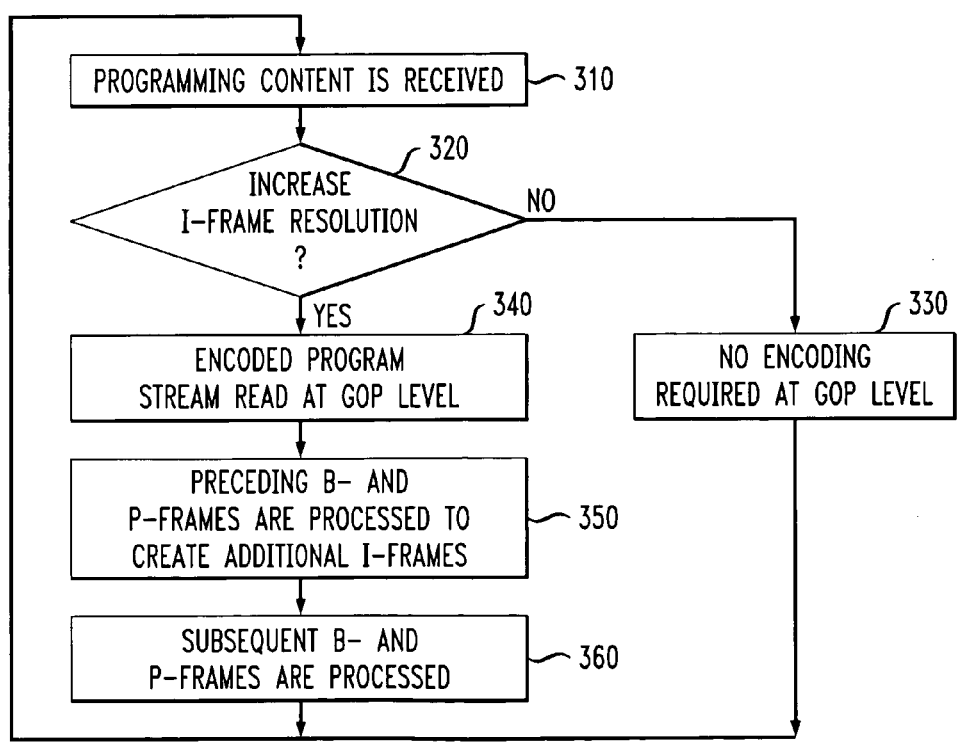

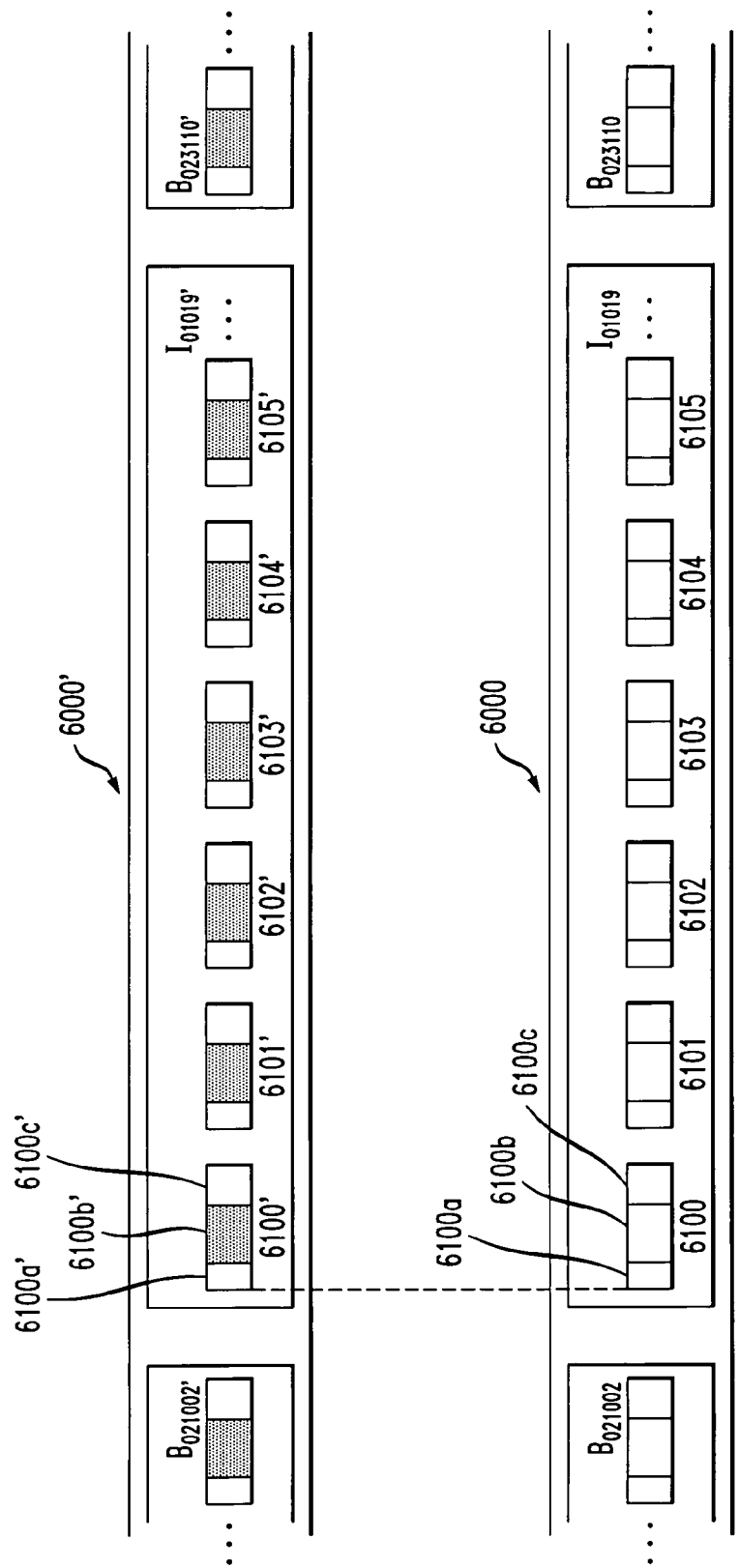

PROGRAMMING CONTENT PROCESSING AND MANAGEMENT SYSTEM AND METHOD

The present application is a continuation-in-part of U.S. application Ser. No. 10/428,719, filed on May 1, 2003, which is a continuation-in-part of U.S. application Ser. No. 10/263,015, filed on Oct. 2, 2002 now U.S. Pat. No. 7,908,626 which claims benefit of U.S. Provisional Application No. 60/377,963, filed on May 3, 2002, all of which are incorporated herein by reference.

FIELD OF THE INVENTION

The invention relates to communications systems and methods, and more particularly to a system and method for processing multimedia content for storage and retrieval in a broadband communications network.

BACKGROUND OF THE INVENTION

With the advent of interactive programming services—e.g., video on demand (VOD), electronic program guides (EPGs), and the like—the complexity associated with processing and storing programming content so that it can be effectively accessed for transmission has increased. For example, a VOD service provides a large number of users with the ability to access a specific program from among a wide array of programming content. In addition, some VOD services allow users to manipulate such content by, e.g., fast-forwarding, rewinding, etc. such programs. In the course of making such VOD programming and options available to users, the content must be made available for access and viewing by a user at any given time. In addition, accommodations must be made such that multiple users—and at times large numbers of users—can view the same programming content at the same time even though the start time of such program may vary from user to user.

In addition, requests are often received to view a given program in different presentations. For example, a user at a set-top terminal may request that a previously broadcast episode of a program be accessed and played. Another (or the same) user may issue a rewind command concerning the same program, whereas another user may issue a 3-times normal play speed fast-forward command.

Accordingly, programming content needs to be stored and processed in a manner such that a seamless viewing experience from a user's vantage is created (e.g., minimal delays in transmission of content, smooth transitions between content segments of the same or different programs, etc.)—regardless of the presentation selected by the user or the number of users accessing the same program.

Moreover, as interactive programming services have become more ubiquitous and the availability of such service continues to grow, it has and will continue to be more challenging for broadband service providers to store and maintain programming content in an effective manner such that administrators of such systems are capable of easily accessing and handling programming content data as desired.

SUMMARY OF THE INVENTION

Thus, in accordance with aspects of the present invention, a technique is implemented to effectively receive streaming digital multimedia content by a headend of a broadband communications system, parse and segment the received content and process the segmented content. Such handling of the received programming content provides for effective storage of the programming content, and effectively provides for access to such content by administrators of the broadband communications system as well as users of such systems.

In accordance with an embodiment of the invention, intraframes (also called I-frames) are used as indicators of a location within a program stream. As a result segmentation messages that are transmitted in the program stream can refer to such indicators (or reference frames). A segmentation message is data incorporated into a program stream which provides information relating to the programming content transmitted in the stream. Through the creation of additional intraframes, a finer temporal resolution is generated, increasing opportunities for using such intraframes for managing the program stream at desired locations within a given program stream. In addition, the creation of additional intraframes also allows for increased resolution when creating trick files (i.e., files that, among other things, allow for content manipulation by users).

In accordance with another aspect of the invention, program streams may be subdivided into substreams by categories. For example, when the headend of a broadband communications system receives programming content carried by a program stream, a processor at the headend is configured, in accordance with an aspect of the invention, to parse and categorize the received content. As a result, individual substreams may be generated by content provider name, program title, subject matter and other categories associated with the received programming content.

In accordance with another aspect of the invention, one or more processors are monitored for failures or delay conditions associated with the receipt, processing or transmission of programming content by such processors.

In accordance with yet another embodiment of the invention, scrambled and descrambled content may be parsed and segmented. Insertion of segmentation messages in the scrambled program stream is facilitated by utilizing a descrambled copy of the scrambled content as a guide. The captured content may be played back many times without further scrambling.

In accordance with yet another embodiment of the invention, portions of programming content that are lost or whose transmission is delayed are compensated for through, for example, the insertion of "stuffing" packets or some other pre-designated programming content. In another aspect of the invention, when the delay in programming content transmission is less than a predetermined threshold, such content is recreated based upon received content.

In yet another embodiment of the invention, programming content is encapsulated (or repackaged) in a user datagram protocol/Internet protocol ("UDP/IP") datagram, thereby increasing the scalability of the staging processor. Such increase in scalability facilitates, for example, load balancing among a plurality of video servers.

In another embodiment of the invention, trick files are generated in a form such that these files can be transferred among various video servers—regardless of server manufacturer—with little or no additional processing resources.

BRIEF DESCRIPTION OF THE DRAWINGS

FIG. 2b is an example of a content related segmentation message in a program stream;

FIG. 2c is an example of rights related segmentation in a program stream;

FIG. 3 is a flowchart illustrating the process of creating reference frames into programming content, in accordance with an embodiment of the invention;

FIG. 6b is a flowchart illustrating a program stream carrying scrambled content and a program stream carrying descrambled content, in accordance with an embodiment of the invention;

DETAILED DESCRIPTION

In accordance with aspects of the present invention, a technique is implemented to effectively receive streaming multimedia content in digital form, parse and segment the received program stream and process the segmented content for effective storage of such programming content and for effectively providing access to such content by administrators of a broadband communication system as well as users of such systems.

The inventive technique enables, among other things: the creation of reference frames for, e.g., effective segmentation of programming content; encapsulation of programming content data as a user datagram protocol/Internet protocol ("UDP/IP") datagram; associating programming content with provider and dedicated resource attributes (content metadata); monitoring staging processor activity; effectively segmenting programming content that is scrambled; developing a unicast and multicast; compensating for missing or delayed programming content; and propagating video servers of varying manufacturers. These and other functionalities are described below in detail.

The Broadband Communications System

Figure 1A:
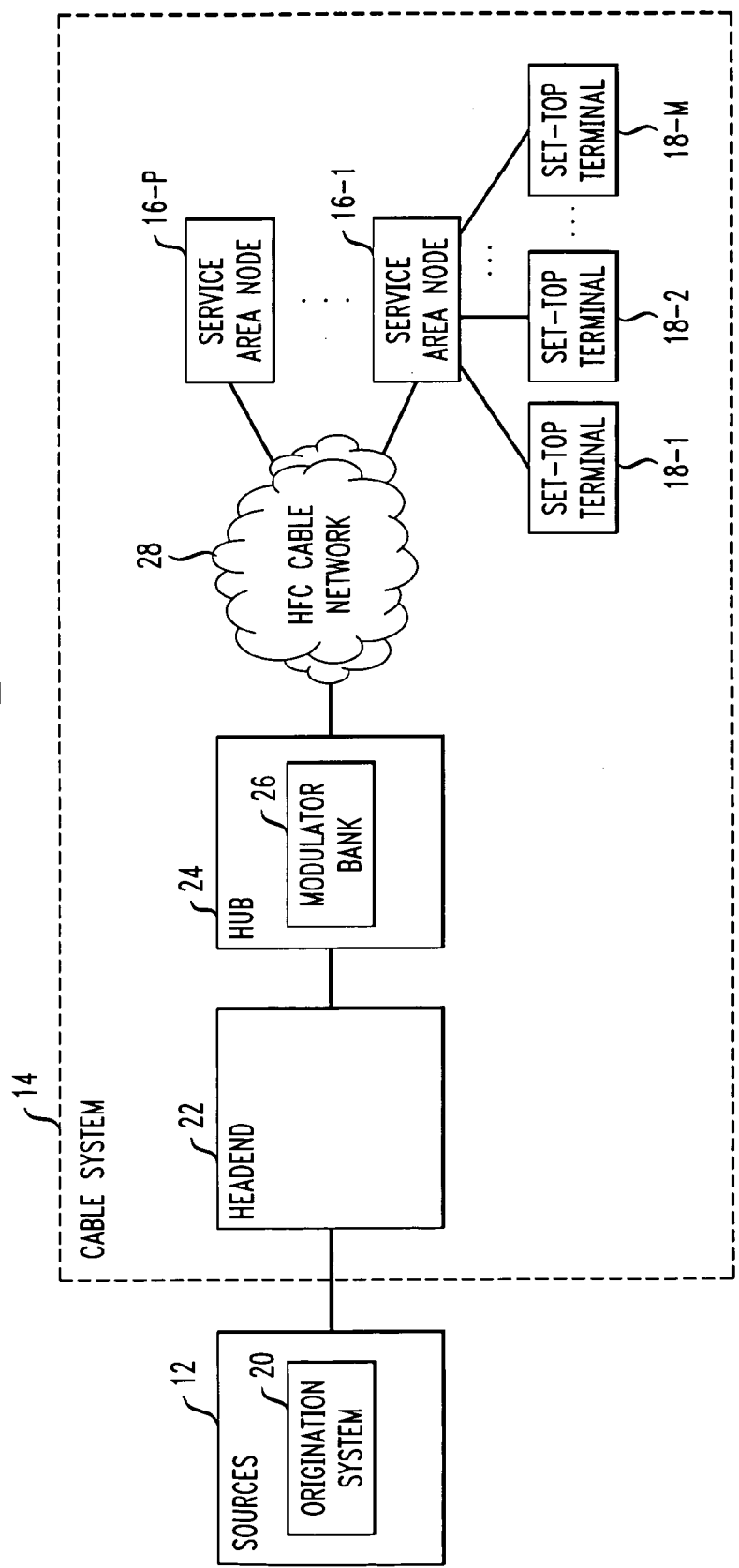
FIG. 1a is a block diagram of certain components of a broadband communications system embodying principles of an embodiment of the invention.

FIG. 1a is a block diagram of a broadband communications system 10 embodying principles of the invention. The system includes one or more program sources 12, and cable system 14 which includes a plurality of service area nodes 16-1 through 16-P in a neighborhood, where P represents an integer. Service area node 16-1, for example, is coupled to set-top terminals 18-1 through 18-M, where M is an integer, at customer's TV's. Information and entertainment services is delivered to set-top terminals 18-1 through 18-M.

Sources 12 create and deliver programming to cable system 14 through an origination system 20. Sources 12 may include analog and digital satellite sources that typically provide the traditional forms of television broadcast programs and information services. Sources 12 may also include terrestrial broadcasters, such as broadcast networks (CBS, NBC, ABC, etc., for example), which typically transmit content from one ground antenna to another ground antenna and/or via cable or fiber. Sources 12 may further include application servers, which typically provide executable code and data for application specific services such as database services, network management services, transactional electronic commerce services, system administration console services, application specific services (such as stock ticker, sports ticker, weather and interactive program guide data), resource management service, connection management services, subscriber cares services, billing services, operation system services, and object management services; and media servers, which provide time-critical media assets such as Moving Pictures Experts Group 2 ("MPEG-2") standard encoded video and audio, MPEG-2 encoded still images, bit-mapped graphic images, PCM digital audio, three dimensional graphic objects, application programs, application data files, etc. Although specific examples of programs and services which may be provided by the aforementioned sources are given herein, other programs and services may also be provided by these or other sources without departing from the spirit and scope of the invention.

Cable system 14 includes headend 22, which processes program materials, such as TV program streams, for example, from sources 12 in digital and analog forms. Digital TV program streams may be formatted according to Motorola Digicipher System, Scientific Atlanta Powerview Systems, the Digital Satellite System (DSS), Digital Broadcast Services (DBS), or Advanced Television Standards Committee (ATSC) standards, for example. Analog TV program streams may be formatted according to the National Television Standards Committee (NTSC) or Phase Alternating Line (PAL) broadcast standard. Headend 22 extracts program content in the analog and digital TV program streams and formats the content, as required, to form one or more MPEG-2 encoded transport streams for transmission to users, e.g., at set-top terminals 18-1 through 18-M. For example, other video codecs (coder/decoders) may be applied. Such reformatting may be applied to those received streams already in an MPEG-2 format. This stems from the fact that the MPEG-2 formatted digital content in the received streams are typically encoded at a variable bit rate (VBR). To avoid data burstiness and to allow for simple remultiplexing, headend 22 may re-encode such digital content at a constant bit rate (CBR) to form transport streams in a conventional manner.

Typically, the transmission of data to, for example, hub 24 requires processing at each hub to requantize and convert the content to a CBR. By converting the content at headend 22, however, the need for a CBR to VBR conversion at hub 24 is obviated. Because a typical cable system tends to utilize a larger number of hubs than headends, the processing of the content at headend 22, rather than hub 24, reduces the number of CBR to VBR conversions and therefore reduces the processing resources used by system 10.

In addition, by converting received content to CBR at the headend 22, the storing of such content onto one or more of video servers 190-1 through 190-N becomes more predictable and therefore manageable. This is accomplished because the rate in which content is transmitted to video servers 190-1 through 190-N is set at a constant rate (e.g. 3.75 MB/second). Thus, because the processing rate is constant, the time for storing program at a predetermined CBR onto one or more of video servers 190-1 through 190-N may be calculated in advance of such storage.

The generated transport streams are typically transmitted from headend 22 to hub 24 via Internet Protocol ("IP") transport over optical fiber. The transport streams may also be transmitted as intermediate frequency signals that have been amplitude modulated ("AM") or as a digital video broadcast (DVB) a synchronous serial interface (ASI) that has also been AM modulated. Hub 24 includes modulator bank 26, among other components. Modulator bank 26 includes multiple modulators, each of which is used to modulate transport streams onto different carriers. Hub 24 is connected to hybrid fiber/coax (HFC) cable network 28, which is connected to service area nodes 16-1 through 16-P. The transport streams may be recorded in headend 22 so that the users at the set-top terminals may manipulate (e.g., pause, fast-forward or rewind) the programming content in the recorded transport streams in a manner described in co-pending, commonly assigned application Ser. No. 10/263,015 ("the '015 application"), filed Oct. 2, 2002, for example, which is incorporated by reference herein. In addition, in accordance with an embodiment of the invention, the transport streams are processed and stored in headend 22 based, at least in part, on segmentation messages, as described further below and in a manner further described in co-pending, commonly-assigned application Ser. No. 10/428,719, hereby incorporated by reference.

The Headend

Figure 1B:
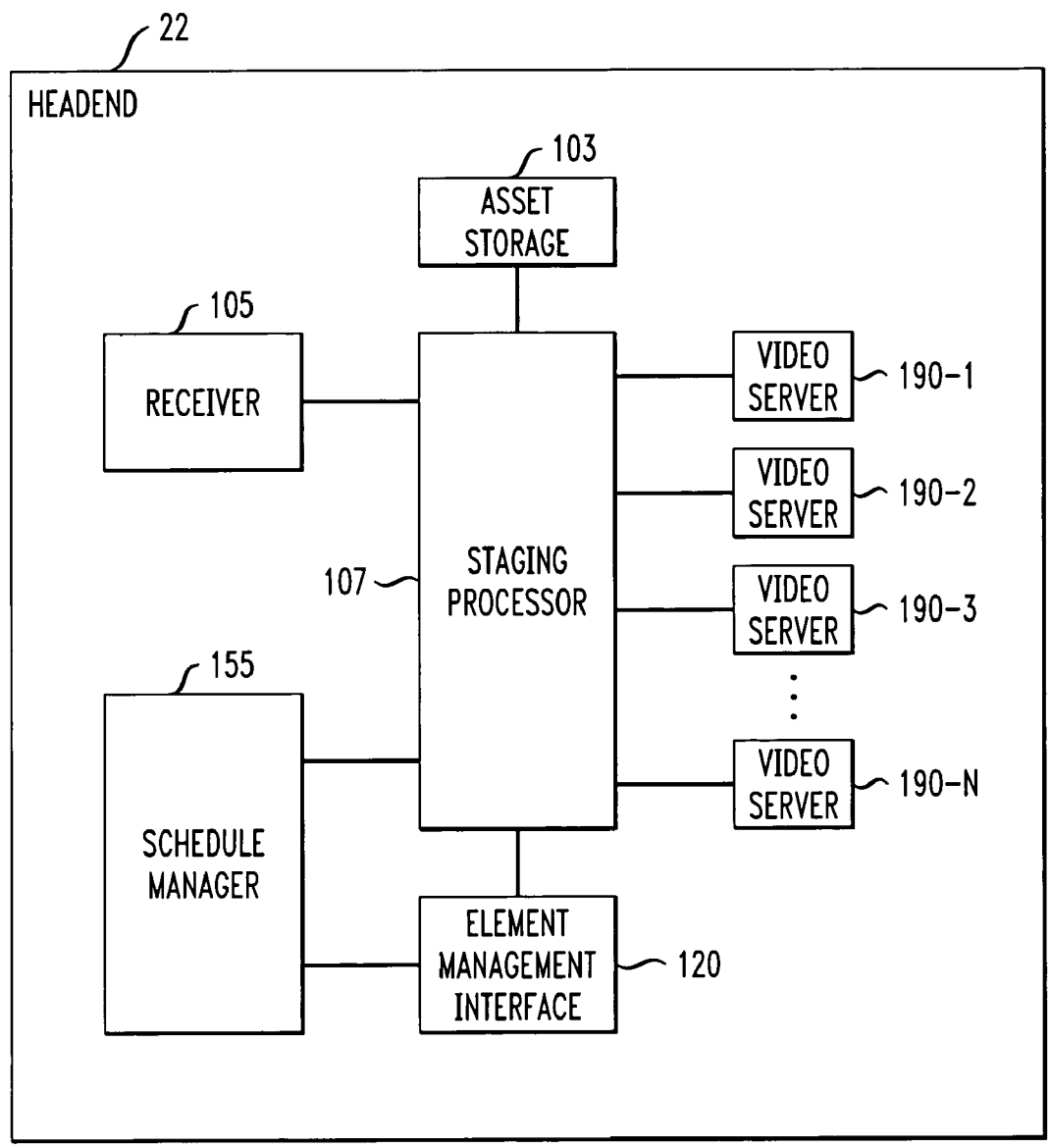
FIG. 1b is a block diagram of certain components of the headend embodied by the broadband communications system of FIG. 1a, in accordance with an embodiment of the invention.

FIG. 1b is a block diagram of certain components of headend 22 by the broadband communications system 10 of FIG. 1a, in accordance with an embodiment of the invention. Headend 22 includes staging processor 107 which is in communication with, among others, receiver 105, element management interface (EMI) 120, schedule manager 155, video servers 190-1 to 190-N (for example, VOD servers), where N is an integer, and asset storage 103, as illustrated in FIG. 1b. It should be noted that the video servers 190-1 to 190-N may be the same manufacturer and model, thereby having the same specification, or may be of different manufacturers and specifications. Thus one server may have different characteristics (such as reliability, processing speed or output capability) than one or more of the other video servers. Receiver 105 receives programming content from origination system 20 and is the source of the transport stream (which in this case is in MPEG-2 format) processed by the staging processor 107. Output from receiver 105 may be compliant with one or more standards, including Digital Headend Interface (DHEI), Digital Video Broadcasting-Asynchronous Serial Interface (DVB-ASI), 10/100 baseT, or the like. Staging processor 107 has a plurality of output ports (109-1 through 109-N), as shown in FIG. 1c, for transmission of received and segmented programming content to video servers 190-1 through 190-N (shown in FIG. 1b).

EMI 120 is responsible for performing static configuration and monitoring of staging processor 107. As described below, EMI 120, among other things, labels content delivered by a provider (e.g., "HBO", "NBC," etc.) to staging processor 107 from receiver 105. EMI 120 also configures mapping of input services to specific output internet protocol (IP) addresses and user datagram protocol/Internet protocol (UDP/IP) port numbers for use in switched video digital broadcasting. An example of such broadcasting is described in International Publication Number WO 03/026274 A2, and is incorporated herein by reference. In addition, as described below, EMI 120 monitors staging processor 107 and schedule manager 155 to ensure that these components are active when such state is desired and that such components are operating properly.

Figure 1C:
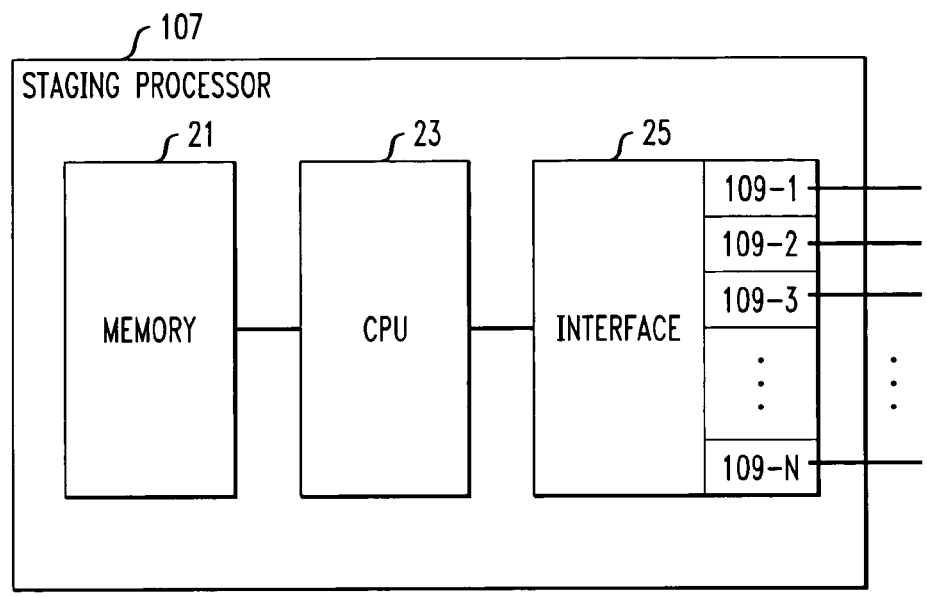
FIG. 1c is a block diagram of the staging processor embodied by the headend of FIG. 1b, in accordance with an embodiment of the invention.

As illustrated by FIG. 1c, staging processor 107 includes memory 21, central processing unit (CPU) 23 and interface 25. Staging processor 107 and schedule manager 155 share a common time reference which allows their communication to follow a contemporaneous timeline. This may be accomplished by, for example, the provision of a system clock (not shown) residing in headend 22 with which staging processor 107 and schedule manager 155 are synchronized.

Figure 1D:
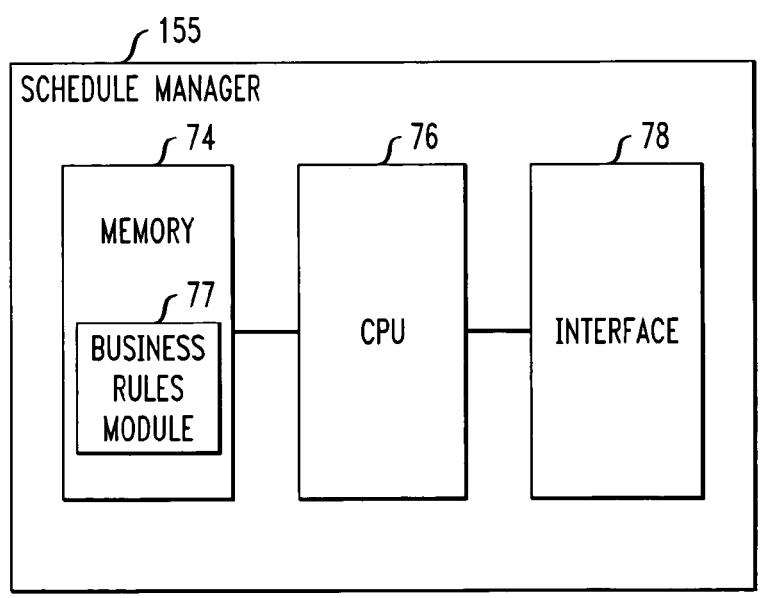
FIG. 1d is a block diagram of the schedule manager embodied by the headend of FIG. 1b, in accordance with an embodiment of the invention.

Schedule manager 155 (which includes memory 74, CPU 76 and interface 78, as illustrated in FIG. 1d) is configured for determining if a particular program should be extracted from a program stream received by staging processor 107 and for providing instructions to staging processor 107 in accordance with one or more business rules relating to further processing of parsed programming content. These business rules, which are described in detail below, are stored in business rules module 77 of schedule manager memory 74.

Thus, if a program is to be captured as a content object, schedule manager 155 creates a content object which may then reference a title that may be ultimately stored on a video server 190 (such as a VOD server), or some other short term or long term storage device. Staging processor 107 segments program streams based on the segmentation messages in the program stream and externally provided program schedule information, under the control of schedule manager 155.

Program schedule information may be provided to schedule manager 155 by an electronic program guide ("EPG") data server (not shown) in the form of a program guide data tables that include a program identification code ("PIC") and the scheduled program start and end times for each program. The transport stream carrying program guide data is typically provided by a third party that aggregates program scheduling information from a plurality of sources. The program guide in the data stream may be stored in schedule manager memory 74 or other such memory in headend 22.

Segmentation of Video of a Program Stream

Figure 2A:
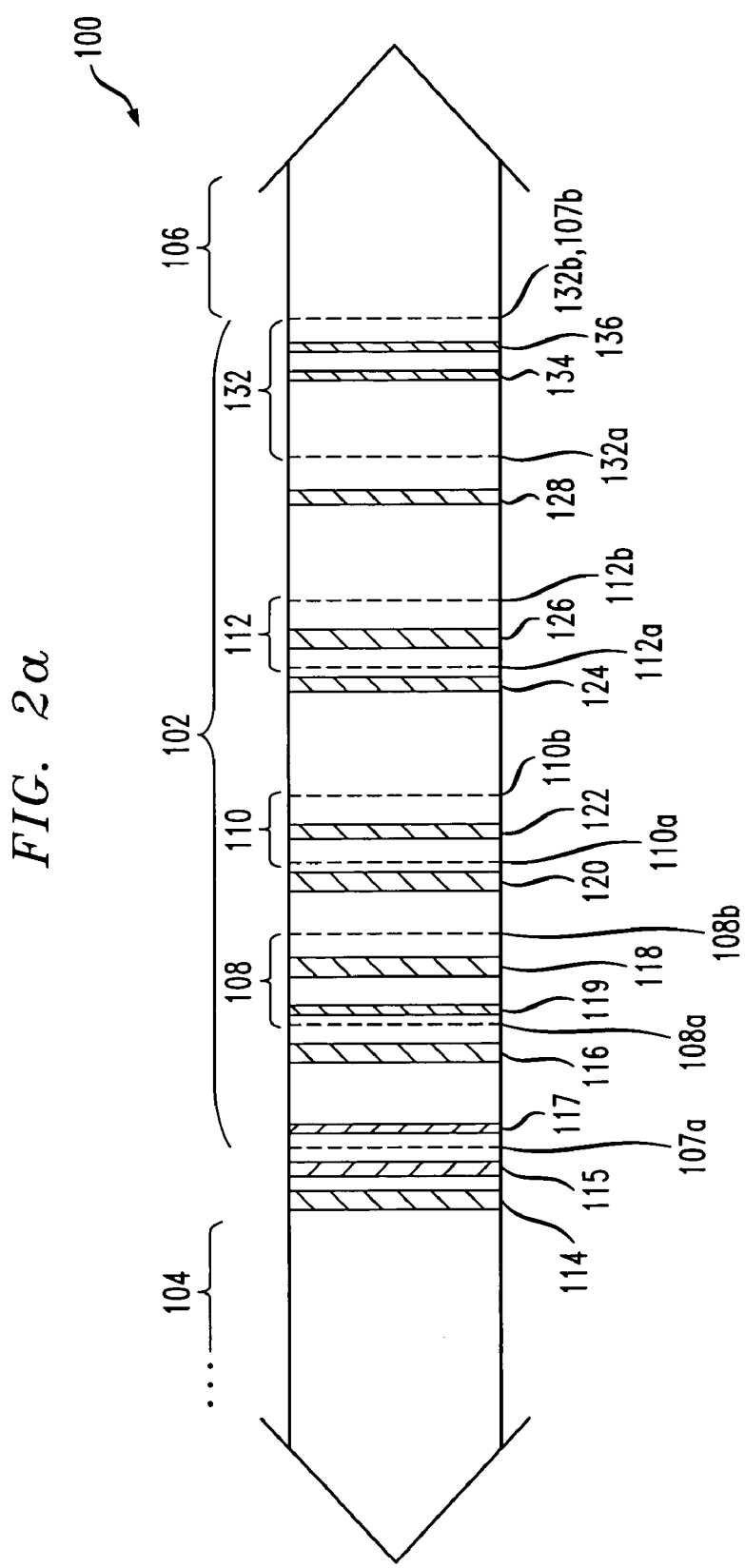
FIG. 2a is a schematic representation of a program stream segmented with segmentation messages in accordance with an embodiment of the invention.

FIG. 2a is a schematic representation of a program stream 100, carrying video information, segmented with segmentation messages in accordance with an embodiment of the invention. The program start and program end segmentation messages in the transport stream 102 provide more precise program start and end times than those provided in the stored program guide data. The transport stream carrying program guide data typically does not provide any information about program portions, such as chapters or advertisements.

Program stream 100 includes a plurality of TV programs, including TV program 102. Portions of TV program 104 preceding TV program 102 and TV program 106 following TV program 102 are shown, as well. TV program 102 starts at point 107a and ends at point 107b. TV program 102 may include chapter 108, such as a monolog, skit, musical performance, guest appearance, sports highlight, interview, weather report, and innings of a baseball game, for example. Chapter 108 starts at point 108a and ends at point 108b. A network commercial 110 and a local commercial 112 are also included within the expanse of program 102, with respective start and end points 110a, 110b, 112a, 112b. Unscheduled content 132 is indicated, with start and end times 132a, 132b, respectively, to represent an overrun of a program, such as overtime in a sports event, for example. Unscheduled content 132 could also be news bulletin. Unscheduled content 132 may or may not be present in a particular program or program stream. A TV program may contain more or fewer chapters 108, network commercials 110 and local commercials 112. Content-related segmentation messages 114, 116, 118, 120, 122, 124, 126, 128, 134 and 136 in accordance with an embodiment of the invention are also included in stream 100.

Segmentation message 114, which may be referred to as a program start message, indicates that TV program 102 will start in A seconds from the time of the appearance of that message. The time period may be defined in segmentation message 114. Segmentation message 114 may also include a PIC that uniquely identifies the program. Other PICs may be used to identify other program segments, such as chapters or advertising. Other information, such as rights-related information, may be provided in segmentation message 114, as well. For example, the rights information may indicate whether there is a right to copy and store program 102 in cable system 14 for later retrieval. FIG. 2b is an example of a segmentation message, such as segmentation message 114, in program stream 100. Segmentation message 114 includes PIC field 152, rights-related information field 154 and time until event field 156, which here indicates the time until the start of program 102.

Instead of including rights information in segmentation message 114, it may be provided in a separate message 115, as shown in FIG. 2c. Rights message 115 may have a similar configuration as segmentation message 114 of FIG. 2b, except that time to event field 156 is not needed. PIC field 158, and two rights fields 160, 162 are shown. More or fewer rights fields may be provided, depending on the number of rights that need to be defined.

Content and rights-related segmentation messages may be formatted in accordance with, for example, the DVS-253 (ANSI/SCTE 35 2001) cueing standard for, for example, digital advertisement insertion. A segmentation message may be in the form of a packet delineated by a sync byte, which is a byte that is unlikely to be replicated in the program stream. The fields discussed above may follow the sync byte, separated by commas. Segmentation messages may be provided over a single channel for all programs in the multiplex.

Returning to FIG. 2a, another rights-related segmentation message 117 is provided after start 107a of program 102. It may be useful to provide a rights message within the expanse of the program or program portion to which the right relates, in addition to or instead of providing rights-related segmentation message 115 prior to the start of program 102. If both rights-related segmentation message 115 and 117 are provided, different types of rights information may be provided in each. For example, the right to copy program 102 may be included in segmentation message 115, so that headend 22 will know prior to the arrival of program 102 whether or not program 102 may be processed for storage. Other types of rights, such as the right to store the program for a limited period of time, which is useful information to have access to after program 102 is stored, may be provided within the expanse of program 102, in rights segmentation message 117.

Other rights related to the use of the stored program may also be more advantageously stored within the expanse of program 102 in message 117. Messages may be transmitted for increased robustness.

Segmentation message 136, which may be referred to as a program end message, indicates that TV program 102 will end in B seconds from the appearance of message 136. The program identification code, and any other desired information, may be included in the message, as well.

Segmentation message 116, which may be referred to as a chapter start message, indicates that a chapter will start in C seconds from the appearance of message 116. A PIC field and a field for an identification code for chapter 108 may be included in the message. A rights information field may also be incorporated in segmentation message 118 or in a separate rights segmentation message 119 within the expanse of chapter 108, particularly if chapter 108 has different rights associated with it than the rights associated with program 102. Segmentation message 118, which may be referred to as a chapter end message, indicates that chapter 108 will end in D seconds from the appearance of message 118.

Segmentation message 120, which may be referred to as a network advertising start message, indicates that network advertising will start in E seconds from the appearance of message 120. A PIC field and a field for an identification code for that segment of advertising may be included in segmentation message 120, as well. Rights information, if any, which may relate to that advertising segment, may be included in segmentation message 120 or in a separate segmentation message (not shown) associated with advertising segment 110. For example, contractual obligations with respect to program 102 may require that the advertising segment 110 be included whenever program 102 is broadcast. Alternatively, the right to delete or replace advertising may be granted. Providing such information in segmentation message 120 or in a separate segmentation message associated with the advertising segment 110, facilitates correct processing of program 102 for storage and assists in ensuring that rights obligations are met. Segmentation message 122, which may be referred to as a network advertising end message, indicates that the network advertising will end in F seconds from the appearance of message 122.

Segmentation message 124, which may be referred to as a local advertising start message, indicates that local advertising will occur in G seconds from the appearance of message 124. A PIC field and a field for an identification code for that segment of local advertising, may be included in segmentation message 120, as well. As above, rights information relating to that segment of local advertising may also be provided in segmentation message 124 or in another segmentation message associated with local advertising segment 112. Segmentation message 126, which may be referred to as a local advertising end message, indicates that that break will end in H seconds from the appearance of message 126. Advertising is typically included in program stream 100 as provided by a source 12 in the expanse 112, indicated by the local advertising start and local advertising end messages 124, 126. Cable system 14 may insert local advertising into the program stream, replacing the advertising originally provided by a source 12. Cable system 14 may use segmentation messages 124, 126 to determine when to start insertion of the local advertising and when to return to the program stream 100. The advertising may be inserted at the headend 22 or at set-top terminals 18-1 through 18-M, as discussed further below.

If program 102 extends beyond its expected end time (such as if program 102 is a sporting event going into overtime, for example), an unscheduled content start segmentation message 128 may be provided, to indicate the start of unscheduled content 132 in I seconds. A PIC field and a field for an identification code for the unscheduled content may also be included. Rights information may be included, as well.

If the unscheduled content is overtime in a sporting event, for example, the unscheduled content ends at the end 107b of program 102. Program end segmentation message 136 may indicate the end of both program 102 and unscheduled content 132 or an unscheduled content end segmentation message 134 may be provided.

If the unscheduled content is a news bulletin, for example, it may end prior to the end of program 102. An unscheduled content end message 134 is then preferably provided to indicate the end of that content.

After the unscheduled content is completed, program 102 may continue to be broadcast at the point where the program was interrupted. In that case, the entire program 102 is broadcast. However, program 102 may then run over the scheduled end time. The unscheduled content end message 134 will indicate when the unscheduled content ends. Alternatively, if the progress of program 102 continues while the unscheduled content is being broadcast, program 102 will end on time, but part of program 102 will not be shown to the viewer. Cable system 14 may want to warn the viewer that a portion of the show is being pre-empted or will run over the scheduled end time. In addition, whether a program has been pre-empted may affect treatment as a stored asset for later retrieval. For example, users may be notified that the program was not broadcast in its entirety and the requested program will not be complete. If the pre-emption is due to a news bulletin, the bulletin may be stored as a separate asset, as well. It may therefore be useful to include information indicating whether a portion of program 102 is pre-empted so that program 102 ends on time or that program 102 is not pre-empted and will run over the scheduled end time, in unscheduled content segmentation message 128 or in another segmentation message.

The A through I time periods referred to above are real numbers. Time periods A through I each may be 6 seconds, for example. Other time periods may be used and different time periods may be used for different segmentation messages. Alternatively, it may be previously defined that all segmentation messages, or segmentation messages of certain types, indicate a predetermined time period until the occurrence of the event.

Both ends of a program or a program portion (such as chapter 108), are preferably indicated by separate segmentation messages. Alternatively, both the time until a start of a program or program portion and the time until the end of that program or program portion may be indicated in the same segmentation message. For example, in segmentation message 114 in FIG. 2b, where Time to Event field 156 indicates the time until the start of program 102, an additional field may be provided to indicate the time until the end of program 102 and/or the duration of the program. Such a segmentation message should be positioned prior to the start of the respective program or program portion. Both a program start segmentation message including a time to end or duration of a program and program end segmentation message 136 may be provided for redundancy, as well.

As shown in FIG. 2a, expanses may exist within other expanses. For example, together, a program start message 114 and a program end message 136 define an expanse of the entire program 102. Program start and end messages for chapter 108, network advertising 110 and local advertising 112 define expanses of the respective program portions within the expanse of program 102. If any portion of a program has a start message without a corresponding end message, program end message 136 terminates all segments without their own end message. If a chapter or advertisement portion is the beginning of a program, a corresponding start message preferably accompanies the program start message, and defines the same boundary time. As mentioned above, a program end message 136 can terminate unscheduled content segment 132.

In accordance with another embodiment, segmentation messages may be sent multiple times or periodically, for redundancy. Since errors in defining the start 107a and end 107b of program 102 could result in storage of an incomplete program or storage of one program including a portion of another program, the program start and program end messages 114, 128, and other such significant segmentation messages, are preferably sent two or more times prior to the event boundary. For example, the program start message 114 and the program end message 136 may be sent twice within a 5 to 8 second window prior to the respective boundary. Advertising segmentation messages, particularly those defining an expanse of local advertising, where cable system 14 may insert their own advertising, are also preferably sent multiple times, because missing an advertising insertion point could adversely impact advertising revenue. Messages may be sent minutes before the boundary as well.

Another important segmentation message that may be repeated are the unscheduled content start message 128 and the unscheduled content end message 134. Since the unscheduled content may extend beyond the scheduled end time of program 102, it is important for the cable company to know this as soon as possible. The exact end time of the unscheduled content may not be known but the end message can indicate an expected time to end of content in the message. The value of the expected time to end of content may become more accurate as the unscheduled content progresses towards its conclusion, and the segmentation messages may reflect this developing accuracy.

For further redundancy, the messages may be sent periodically throughout a program or program portion. For example, a segmentation message to indicate an event may be sent every minute starting from the start of a prior event. As an event is approached, the time period between messages may become shorter. For example, messages may be sent every minute until the boundary is 1 minute away. Then the messages may be sent every 10 seconds or more frequently. Segmentation messages may also be provided within one or more prior portions to indicate an event in a subsequent portion. For example, in program stream 100, national advertising start messages 120 may appear one or more times within chapter 108 or even before the start of chapter 108 in the program stream.

If two segmentation messages received at different times indicate different event times, the time of the segmentation message arriving last is considered to be more accurate. It may, for example, reflect an unanticipated change in the end time of a program, such as overtime or postponement of a commercial in a sports event.

Other segmentation messages that may be provided include a table of all of the segmentation points in a program. A segmentation point is a place in a transport stream in which a content provider can insert a segmentation message. Tables of particular types of segmentation messages or all of the segmentation messages may also be embedded in program stream 100. For example, a table of each type of advertising (national and local, for example) in a program may be provided. Additional information may be provided in the segmentation message to identify a commercial sponsor of respective advertising to assist cable system 14 in inserting appropriate advertising. For example, if the segmentation message includes an indication that a national ad that must be broadcast is for a soda company (Coca Cola, for example), then a cable system 14 can more readily avoid placement of an advertisement for a second soda company (Pepsi, for example), in a local ad spot in proximity to the ad for the first soda company, which may be a contractual obligation of cable system 14. Receipt of such information in a table at the beginning of a program or prior to that, allows cable system 14 time to plan for ad placement in the program. Providing all segmentation messages in a table in program stream 100 at the beginning of a program or prior to that would give cable system 100 more time to plan for other events, as well.

Another segmentation message that may be provided is a message to indicate that a scheduled program is being replaced by source 12, or may be replaced by cable system 14, by substitute programming. For example, if a sporting event is cancelled due to rain, source 12 may provide substitute programming and the cable company may have the option of providing its own substitute programming. A segmentation message may be provided as part of program start message 114 or prior to it, to indicate that substitute programming follows, and to identify the programming.

Creation of Trick Files

Processor 107 is further configured to create, in real-time, trick files associated with, for example, program 102 as part of the asset which are used to perform trick mode functions (e.g., rewinding and fast-forwarding) on program 102. One such trick file in this instance is a "fast-forward" trick file which contains an array of identifiers of intra-coded frames (or I-frames) in the program stream (MPEG-2 encoded as mentioned before) corresponding to program 102 in a forward direction. I-frames, also called intra-frames, is one of three types of video frame used in MPEG video compression. The other two frame types are forward predicted frames (P-frames) and bi-directional predicted frames (B-frames).

An I-frame is encoded as a single image, with no reference to any past or future frames. The encoding scheme used is similar to JPEG compression. A P-frame is encoded relative to the past reference frame. A reference frame is a P- or I-frame. The past reference frame is the closest preceding reference frame. Each macroblock in a P-frame can be encoded either as an I-macroblock or as a P-macroblock. A B-frame is encoded relative to the past reference frame, the future reference frame, or both frames. The future reference frame is the closest following reference frame (I or P). The encoding for B-frames is similar to P-frames, except that motion vectors may refer to areas in the future reference frames.

Another trick file is a "rewind" trick file which contains an array of identifiers of I-frames in the program stream corresponding to program 102 in the reverse direction. The I-frame identifiers in the trick files are used as indices or markers for rewinding and fast-forwarding of program 102. It should be noted that not all of the I-frames associated with program 102 are selected for the trick files. Rather, the I-frames are selected periodically along the program stream. Thus, the shorter the period is, the closer the instants from which program 102 can be rewound, and to which program 102 can be fast-forwarded, thereby achieving finer adjustments.

It should also be noted that, in accordance with an alternative embodiment of the invention, one trick file can support both fast-forward and rewind commands that are received by a user. In such case, the trick file contains an array of identifiers of I-frames in the program stream corresponding to program 102 in, for example, a forward direction. If a fast-forward command is received, the selected identifiers corresponding to periodic display of the program stream are accessed in a forward order, thereby presenting a fast-forward display to the user. If, however, a rewind command is received, the selected identifiers are accessed in the reverse order, thereby presenting a rewind display to the user.

In the event that program 102 is pre-staged, the program content comes with the corresponding metadata file and trick files associated with the program. Processor 107 stores the created or pre-staged asset including the metadata file and trick files associated with a program according to its program designation in asset storage 103.

The access of such files for manipulation of programming content is fully described in the '015 application, incorporated herein by reference.

As described above, trick files are generated and stored by components (i.e., staging processor 107 and asset storage 103) that are typically accessible to a plurality of video servers—e.g., video servers 190-1 to 190-N. Thus, if the trick files comprise I-frames (or other frame types, such as P-frames) that can be universally processed by each of video servers 190-1 to 190-N, trick file content need not be regenerated or reformatted based upon the formatting requirements of each different video server.

Thus, in accordance with an embodiment of the invention, trick files comprise, for example, I-frames that are formatted in a universal format—i.e., a format that can be processed by various types of servers (e.g., servers of different manufacturers or model type). For example, the universal format may comprise I-frames having headers which include information relating to the type, length and value structure of each respective frame. The type field is a unique identifier for the I-frame, the length field specifies the length of the data and the value field contains a variable length of data bytes. In addition, the universal format contains pointers into key locations of the MPEG-2 program stream.

Thus, in accordance with an embodiment of the invention, a trick-mode file can contain a subset of a received MPEG-2 stream which is generated by performing temporal decimation of the original video file. As a result, the normal playback of such a file simulates trick-mode operations.

By formatting the I-frames in a universal format, files containing these frames may then be stored on one or more servers 190-1 through 190-N (in addition to or instead of asset storage 103) with further formatting or processing. In addition, by generating such trick files in a universal format, no additional processing resources are required to reformat the trick files when accessed by one or more video servers 190-1 through 190-N. Accordingly, the need to reformat trick files when accessed by video servers of varying manufacturers is obviated.

In addition, no additional processing is required when trick file programming content is transferred among servers. For example, if video server 190-1 is storing programming content and is reaching its capacity, a portion of the programming content stored by video server 190-1 may be transferred to video server 190-2 without the need to reformat such content.

In accordance with an embodiment of the invention, staging processor 107 generates trick files for received MPEG content, by processing the content at the MPEG video stream level (rather than, for example, the elementary stream level). At this point, staging processor 107 is able to convert the received content from VBR to CBR (as described above) and/or generate I-frames associated with such content.

As a result, once such trick files are generated by staging processor 107, video servers 190-1 through 190-N do not have to perform any formatting itself—these servers only pump out the received content. Accordingly, the burden of processing these trick files is removed from video servers 190-1 through 190-N.

Increasing Segmentation Resolution by Creation of Reference Frames

As described above, programming content is received and temporarily stored as a program stream in MPEG-2 format by staging processor memory 21. In accordance with the MPEG-2 standard, video data that makes up the programming content is compressed based on a sequence of groups of pictures ("GOPs"), in which each GOP typically begins with an intra-coded picture frame (I-frame), which is obtained by spatially compressing a complete picture using discrete cosine transform (DCT). As a result, if an error or a channel switch occurs, it is possible to resume correct decoding at the next I-frame.

Typically, the GOP may represent up to 15 additional frames—i.e., P-frames (predicted frames) and B-frames (bi-directional frames)—by providing a much smaller block of digital data that indicates how small portions of the I-frame, referred to as macroblocks, move over time.

P-frames are coded as differences between the current frame and the last I-frame or P-frame. Each macroblock in the two frames is compared and if they match, motion vectors are calculated to create a frame that stores only significant differences, again compressed using the DCT algorithm.

B-frames are similar to P-frames but compare both the preceding and the subsequent I-frame or P-frame data. The B-frames store the average of matching macroblocks or motion vectors. Because they are encoded based on both preceding and subsequent data, they are more effective at storing and displaying motion.

I-frames are encoded for spatial redundancy, and P-frames and B-frames are encoded for temporal redundancy. There are a number of different structures, but a common one is 15 frames as:

$$IBBPBBPBBPBBPBB. \quad (\alpha)$$

In addition to the I-, B- and P-frames, program streams comprise segmentation messages which, as described above, are used for providing information relating to the programming content transmitted in the stream.

In accordance with an embodiment of the invention, an I-frame may be used as a "reference frame"—i.e., an indicator to a location in the program stream to which a segmentation message refers when fulfilling the requirements of the message. Thus, for example, if a segmentation message contains information for the insertion of a blank screen for one-half second at let's say the end of program 102 (FIG. 2a), it is desirable to insert a reference frame such that the message can identify the desired point in the stream in which the blank screen is to be inserted.

Placement of a reference frame affects the location within the program in which a segmentation message instruction is fulfilled, in this case insertion of a blank screen. Thus, increased frequency of such reference frames may be desirable to increase the availability of points within the program stream for effectuating a segmentation message instruction. Such capability enables the content provider and the cable service provider to have effective control over the management of the program stream.

In accordance with an embodiment of the invention, I-frames (which are also known as intra-coded picture frames or intraframes (and are used herein interchangeably)) serve as reference frames. As a result, in accordance with an embodiment of the invention, staging processor 107 is configured with the capability of creating additional intraframes in received programming content. By creating these additional intraframes, staging processor 107 achieves a finer temporal resolution. In other words, by including intraframes, opportunities increase for utilizing such intraframes for managing the program stream at desired locations within the stream.

The creation of additional intraframes, not only provides increased resolution for managing content, but also for creating trick files as described above.

In accordance with an embodiment of the invention, additional I-frames may be generated by staging processor CPU 23 to provide a finer temporal resolution. This may be accomplished by configuring staging processor CPU 23 to process B-frames and P-frames that are received in the program stream to further encode the GOP resulting in an increase of I-frames.

Thus, suppose in GOP α provided above, it is desirable to create an additional intraframe at the position in between the first B-frame and the second B-frame. Accordingly, staging processor CPU 23 constructs a new I-frame (e.g., I') immediately after the first B-frame. A high fidelity technique is implemented to re-encode the subsequent P-frames and B-frames of the GOP in light of new I-frame, I'. As a result, a new GOP structure is formed. The resulting GOP structure, in this example, may look like this:

$$IBI'P'B'B'P'B'B'P'B'B'P'B'B'P'B'B', \quad (\beta)$$

where B' and P' represent new B-frames and P-frames different from those in GOP a subjected to the requantization and high fidelity re-encoding described below.

To create GOP β, the high fidelity technique involves the following steps and transient sequences (1) through (4). In the first step, I' is constructed from the current B-frame, the preceding I-frame and B-frame, and the ensuing P-frame, resulting in the following transient sequence:

$$IBI'. \quad (1)$$

In the second step, a new P-frame (P') is generated using the new I-frame (I'), resulting in the following transient sequence:

$$IBI'P'. \quad (2)$$

In the third step, the new P-frame is used to generate another P-frame, resulting in the following transient sequence:

$$IBI'P'P'. \quad (3)$$

In the fourth step, two new B-frames (B'B') are generated and are located between the two new P-frames (P'P'), resulting in the following transient sequence:

$$IBI'P'B'B'P'. \quad (4)$$

These steps of creating new I-, P- and B-frames are repeated until the end of the GOP is reached.

Staging processor CPU 23 then applies a well known requantization technique to the subsequent P-frame (P') and subsequent B-frames (B') to ensure that the change to the GOP's does not overflow a video buffer verifier (VBV). The VBV is a model hypothetical decoder buffer that prevents overflowing and underflowing when the decoder is fed a program stream carrying MPEG-2 formatted content. Thus, the VBV is a MPEG standard that helps ensure that the program stream does not exceed the buffer on an MPEG decoder.

As is well known in the art, the requantization technique achieves bit-rate reduction of encoded video by re-quantizing DCT coefficients with a larger quantization step size. As a result, more DCT coefficients become zero, in turn requiring fewer variable length codes (VLC) to encode the re-quantized coefficients.

FIG. 3 illustrates a flowchart for increasing resolution of a program stream by creating reference frames. Such a procedure may be implemented if, for example, finer resolution for the placement of segmentation boundaries is desired or if an increase in trick file resolution is desired. At step 310, programming content is received and temporarily stored as a program stream in MPEG-2 format by staging processor memory 21. Upon receiving programming content, staging processor CPU 23 determines whether increased temporal resolution of the programming content received at headend 22 is desired (step 320). If staging processor CPU 76 determines that no intraframe resolution refinement is desired, then the received content is processed without further encoding at the GOP level (step 330).

If, however, increased resolution is desired, then staging processor CPU 23 reads the encoded transport stream at the GOP level (step 340). Staging processor CPU 23, at step 350, then processes the preceding B-frames and P-frames from the received GOP to create additional I-frames. Staging processor CPU 23 also re-encodes subsequent P-frames within the GOP based on the current frame and the newly created I-frame (e.g., I'). In addition CPU 23 re-encodes subsequent B-frames by comparing both the preceding and the subsequent I-frame or P-frame data (step 360). These steps re-encode, for example, GOP α provided above to generate, for example, the resulting GOP β provided above.

Allocation of Programming Content

Transport streams carrying content relating to multiple programs typically received from, e.g., origination system 20, comprise large amounts of programming content, including an audio substream, a video substream, and a data substream. To more effectively handle the volume of programming content that is carried by such a transport stream and received by staging processor 107, EMI 120 is configured, in accordance with an aspect of the invention, to categorize the data that makes up a given program stream or substreams upon receipt.

Figures 4A, 4B:
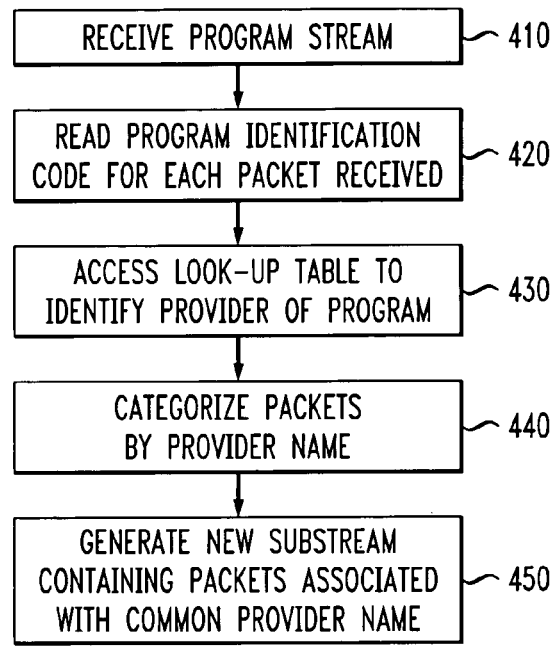
FIG. 4a is a flowchart illustrating the process of associating programming content with a content provider, in accordance with an embodiment of the invention.
FIG. 4b is a table illustrating the association of data concerning programming content, in accordance with an embodiment of the invention.

FIG. 4a is a flowchart illustrating the process of associating programming content with a content provider, in accordance with an embodiment of the invention. Suppose a program stream is received at headend 22 (step 410). In accordance with an embodiment of the invention, EMI 120 is configured to read the PIC associated with the data packets that make up the received program stream or substream(s) (step 420) and to access a lookup table (e.g., table 400 of FIG. 4b) stored by schedule manager 155 for access by EMI 120 to identify the provider of the transmitted content (e.g., HBO, NBC, CNN, etc.) (step 430). In an embodiment of the invention, the information that is stored in table 400 is sent by the content providers.

Thus, suppose a data packet is received bearing a PIC (field 462) with a value of 001000, look-up table 400 is accessed by EMI 120 and additional information relating to the identified programming content is accessed. For example, as illustrated in table 400, record 461 indicates that a data packet having a PIC with the value of 001000 relates to programming content having the program title (field 464) "Friends," provided by content provider (field 466) "NBC," and relating to a subject matter (field 468) designated a "comedy." Thus, in accordance with this aspect of the invention, the transport stream carries a category designation that is associated with the program stream and/or substreams carrying programming content.

As a result, upon identifying the provider of the transmitted content, staging processor CPU 23 categorizes the data packets, in this example, by provider name (step 440) and a new substream is generated which comprises the video, audio, data components of programming content relating to that provider (step 450). Such organization may be generated to provide ease of use to, for example, an administrator of cable system 14.

Transport streams carrying content concerning a single program may be generated by staging processor CPU 23 in accordance with parameters other than content provider name (field 466). Rather, program title (field 464), subject matter (field 468), or the like may be categories used by staging processor 23 to generate respective program streams and/or substreams with such designated category as instructed by schedule manager 155. This designation enables an administrator of the cable service provider to generate and subsequently identify a desired program stream containing content relating to a specific program, program title, content provider, subject matter, or the like, based on the categorization fields 462, 464, 466, 468 shown in FIG. 4b, or the like.

In addition to communicating with EMI 120 to categorize programming content and generating substreams relating thereto, staging processor 107 is also configured, in accordance with an embodiment of the invention, to direct programming content to one or more of its output ports 109-1 through 109-N via staging processor interface 25 in an intelligent manner. Programming content that is categorized by staging processor 107 is output over, for example, these Gigabit Ethernet (GigE) ports 109-1 through 109-N (see FIG. 1c) in streaming form for switching digital broadcast delivery and, as described below, is assigned to a specified port of staging processor 107 for downstream transmission.

Thus, in accordance with an embodiment of the invention, staging processor 107 is configured to monitor the number of output ports that are active and the identity of such ports, as well as the volume of programming content that is directed to each port. As subsequent programming content is received by headend 22, staging processor 107 then determines which output port(s) should receive the streaming content based upon certain business rules provided by business rule module 77 of scheduling manager memory 74.

For example, reducing congestion is one of the business rules that is stored in business rules module 77 of schedule manager memory 74. Thus, staging processor 107 may be instructed to reduce congestion among the active output ports 109-1 through 109-N. In accordance with an embodiment of the invention, when this business rule is promulgated by the administrator of cable system 14, streaming programming content is directed among each of the active output ports—e.g., ports 109-1 through 109-N—in a balanced or close to balanced fashion. In such an embodiment, streaming content is transmitted through interface 25 of staging processor 107, for a predetermined length of time, to the active output port that least recently received programming content. The amount of data being transmitted to each port 109-1 through 109-N is monitored by staging processor CPU 23 so that the load handled by these ports can be balanced. In accordance with an embodiment of the invention, schedule manager 155 provides the programming schedule to staging processor CPU 23. When programming content relating to a give program is transmitted from schedule manager 155 to staging processor 107, CPU 23 first determines whether any of its ports 109-1 through 109-N are free to receive and transmit the content. If no port is available, it determines which active port was the last to be assigned programming content and then forwards the newly received content to such port.

Processing programming content of one or more predetermined content providers is one of the business rules that is stored in business rules module 77 of scheduling manager memory 74. Thus, in accordance with another embodiment of the invention, staging processor 107 receives instructions from schedule manager 155 such that its output ports are assigned to handle a predetermined category of programming content provided by the transport stream. For example, where content is categorized by provider name, content type, program ID, etc., each active port may be assigned to handle one or more transport streams that make up one or more of such categories of content. Thus, for example, one output port—e.g., 109-1—may handle programming content provided by CNN and NBC, and another port—e.g., 109-2—may handle programming content provided by ABC, FOX and TNT.

As described above, schedule manager 155 is configured to control staging processor 107. In accordance with an aspect of the invention, schedule manager memory 74 stores instructions relating to which video server(s) 190-1 to 190-N should receive a given program, the number of video servers that receive the content and where on the server the program is stored.

For example, effective processing of popular or high demand programming is a business rule that is stored by business rule module 77 of schedule manager memory 74. Thus, in accordance with an embodiment of the invention, schedule manager 155 is configured to determine which programs are presently deemed popular—i.e., in higher demand by users. Such configuration may be implemented when the business rule relating to storage based upon high demand programming (as stored by module 77) is invoked. Depending on the level of popularity of the program, such programming content may be stored on multiple video servers 190.

Thus, in accordance with an embodiment of the invention, schedule manager 155 is configured to identify which programs are deemed most popular. Such determination may be determined, in accordance with an embodiment of the invention, by the number of requests received by headend 22 generated by set-top terminals 18-1 through 18-M for the same program. In an illustrative embodiment, the popularity of a program is determined based on viewing statistics, which are generated based on data in requests issued from the set-top terminals 18-1 through 18-M in a service area. The requests may be issued in response to the subscribers at one or more set-top terminals 18-1 through 18-M selecting and deselecting the program. For example, a program channel is considered popular when the number of set-top terminals receiving programming content associated with the program channel exceeds a predetermined threshold. This information may be provided to schedule manager 155 for tracking which programs are deemed popular or in high demand. Additional means may be used to identify high demand programming content including, for example, heuristics.

It should be noted that requests received by headend 22 from set-top terminals 18-1 through 18-M may be communicated via a reverse passband, e.g., 5-40 MHz band, of a coaxial cable. The reverse passband comprises reverse data channels (RDCs) having a 1 MHz bandwidth in this instance, through which quaternary phase shift keying (QPSK) signals containing upstream data are transmitted. It should be noted that the 1 MHz bandwidth allocated for an RDC here is for illustrative purposes only. It will be appreciated that a person skilled in the art may allocate other bandwidths therefor depending on the actual implementations. A set-top terminal utilizes an RDC for sending both application data and control messages. For example, the Digital Audio Visual Council (DAVIC), a standard setting organization, has defined a contention-based access mechanism whereby multiple set-top terminals share an RDC. This mechanism enables the set-top terminals to transmit upstream messages without a dedicated connection to a QPSK demodulator. The mechanism also provides equal access to the set-top terminals that share the RDC, and enables detection and recovery from reverse path collisions that occur when two or more of the terminals transmit an upstream message simultaneously.

In accordance with another embodiment of the invention, whether a program is designated as popular or in high demand may also be determined by instructing schedule manager 155 to read metadata or a segmentation message that is transmitted within the downstream program stream as it is sent to staging processor 107. For example, a segmentation message may be associated with a program stream indicating that a given program is a prime time show or is anticipated to be in high demand because, for example, it is being broadcast for its first time. In addition, metadata may be inserted into the program stream indicating that the program associated with the metadata is in high demand.

By providing staging processor 107 with a business rule that all programming designated as popular or in high demand be sent to a pre-designated video server (e.g., server 190-1), control over the destination of such content for storage is maintained. Thus, for example, it may be desirable to send all programming that is designated as popular or in high demand to a server that is deemed to be more reliable than others. By monitoring which programming content meets this category and identifying which servers are deemed most suitable (in terms of, e.g., speed, storage reliability, output capability), scheduling manager 155 can instruct staging processor 107 to direct the programming content to the appropriate server.

Additionally, a protocol may be defined such that certain programming content is to be stored in one or more video servers 190 that have a higher output capability. Such storage protocol may be implemented when the pertinent business rule relating thereto (as stored in module 77) is invoked. Thus, in accordance with an embodiment, schedule manager 155 stores information in schedule manager memory 74 that, among other things, provides the output capabilities of the video servers 190-1 through 190-N that are in communication with staging processor 107 via ports 109-1 through 109-N. Moreover, the programming content may be stored in the respective video servers 190-1 through 190-N in a manner such that programming content can be made more readily available upon the request for a certain program.

In addition to program popularity, schedule manager 155 may be configured to identify other characteristics of programs received by staging processor 107, such as program type or program source (i.e., content provider). This information may be ascertained by reading one or more segmentation messages carried in the program stream or by accessing table 400 stored by schedule manager 155. Such configuration may be implemented when the business rule relating to storage based upon program type or program source (as stored in module 77) is invoked. Schedule manager 155 may then direct files storing programming content to a video server based upon program type and/or program source, thereby enabling video servers 190-1 to 190-N to store programming based upon such characteristic(s). By enabling programming content to be stored in a logical manner, such as by programming content, program type, content provider, and the like, operation and maintenance of cable system 14 is facilitated. Thus, if a system administrator needs to perform a given operation with respect to system 14 that relates to the storage of programming content on one of the system's video servers 190, access to the programming content by the administrator is facilitated by having the programming content logically organized. For example, by having all advertising content stored on a specific server or set of servers, an administrator of cable system 14 can more easily access and handle such content.

In accordance with another embodiment of the invention, schedule manager 155 may direct programming content to video servers 190-1 through 190-N based upon other characteristics or considerations, including whether the program is "premium" content (i.e., content for which additional fees may be charged) which may be stored on a server having, for example, high reliability, or free TV content which may be stored on a server of lesser reliability.

In addition, programming content may be logically stored in one or more video servers 190-1 through 190-N in a manner in which such content may be accessed in an efficient manner. Thus, in addition to identifying which of the available video servers 190-1 through 190-N is to receive specified programming content, scheduling manager 155 is also configured to provide instructions to video servers 190-1 through 190-N regarding the manner in which the content is stored by such server. In addition, each of these video servers 190-1 through 190-N may be instructed to redistributing programming content within its respective server as programming content is added to or removed from such server.

It should be noted that although the examples provided above relate to circumstances when content is being transmitted to only one output port, staging processor CPU 23 may be instructed by scheduling manager 155 to send the same programming content to multiple output ports. Such configuration of sending the same programming content to multiple output ports increases content transmission reliability by redundancy. For example, if the same programming content is directed to two output ports (let's say ports 109-1 and 109-2), and congestion or a failure occurs at one of the two ports (e.g., port 109-1), but not the other port (e.g., port 109-2), the transmitted programming content will not be substantially delayed by the congestion or failure condition at port 109-1. Thus, another business rule stored by business rule module 77 of scheduling manager memory 74 relates to implementing redundancy protocols to increase transmission reliability.

By directing the transmission of programming content to one or more output ports 109-1 through 109-N as determined by CPU 23, staging processor 107 can effectively handle a large volume of program streams and, in many instances, congestion and failure may be reduced by intelligently sharing the transmission of program streams among active output ports.

In addition to dictating which output port handles programming content received by headend 22, EMI 120 may also provide staging processor 107 with destination management protocols, such as the Interactive Service Architecture Common Object Request Broker Architecture (CORBA) model, thereby enabling programming content to be intelligently distributed among a plurality of video servers 190-1 to 190-N for ultimate transmission to users.

The transfer of programming content to a video server—such as video server 190-1—is performed over cable system 14 in real-time in which staging processor interface 25 uses a standard file transfer protocol such as NFS, ftp, I-SCSI, or the like. This real-time transfer may be accomplished as minimal buffering between staging processor 107 and the destination server, such as video server 190-1, resulting from the intelligent distribution of programming content as described herein. Additional buffering may be added to support situations of destination video server failure.

In addition, programming content that is processed by staging processor 107 (e.g., formatting, generating trick files, etc.) may be converted to files and transferred to one or more video servers 190-1 through 190-N on a non-real-time basis.

Monitoring by the Staging Processor and EMI

Figure 5:
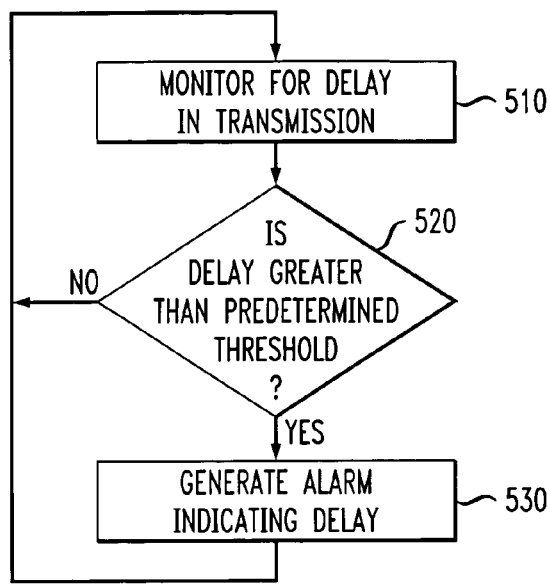
FIG. 5 is a flowchart illustrating the process of monitoring staging processor activity, in accordance with an embodiment of the invention.

Staging processor 107 may be configured to monitor for failures or delays with respect to the receipt, processing or transmission of programming content. In an embodiment of the invention, staging processor 107 monitors the processing of such content and EMI 120 is configured for providing data concerning, for example, alerts or instructions, in response to the monitoring by staging processor 107. For example, referring to FIG. 5, processor 107 may be configured to monitor whether transmission of programming content to staging processor 107—or a given port of staging processor 107—is delayed by a predetermined amount of time (such as 3-5 seconds) (steps 510 and 520) indicating that the staging processor 107 or at least one of its ports has become inactive. This may be accomplished, in accordance with and embodiment of the invention, by detecting whether packets are being received. No packets being received for the predetermined period may result from, e.g., the cable to staging processor 107 being disconnected or a failure by staging processor 107. EMI 120, in accordance with an embodiment of the invention, may be configured to poll staging processor 107 to ensure that it is properly receiving data as described below.

Thus, if, for example, EMI 120 is informed of a delay in transmission of programming content, wherein the delay is greater than, for example three seconds, an alarm is generated by EMI 120 (step 530). In an aspect of the invention, the alarm informs an administrator of system 14 of the delay in transmission by staging processor 107.

In accordance with another embodiment of the invention, CPU 23 of staging processor 107 may instruct EMI 120 to generate an alarm if it is expecting staging processor CPU 23 to generate a subsequent I-frame based upon a previously transmitted I-frame. Staging processor 107 may be configured to monitor for the next I-frame by knowing the predetermined frequency in which I-frames are received. With such a process, staging processor 107 is configured to expect the receipt of I-frames at the predetermined frequency. In accordance with an embodiment of the invention, if one or more I-frames are not received within such predetermined frequency, an alarm is generated by EMI 120 indicating that a transmission failure may have occurred.

Staging processor 107 may also be configured to monitor for the receipt of other regularly received MPEG-2 program specific information, such as a program map table (PMT) reference. Staging processor 107 determines whether such information is received at a predetermined frequency (e.g., on the order of every 100 ms, or 200 ms, or the like). Such frequency is programmable and may be predefined by the administrator of system 14. For example, the PMT lists, for each program in a program stream, the currently available video, audio and data components. Optional descriptors can give additional details about a program or a component. If staging processor 107 detects that a PMT reference for a given program is not received within the designated frequency, an alarm is generated by EMI 120 indicating that a transmission failure may have occurred.

In yet another embodiment of the invention, the frequency in which MPEG-2 packets are delivered may also be monitored by staging processor 107 to detect possible delay or failure of programming content delivery. Because transmission of packets carrying programming content data is made using a predetermined standard, such as DVB or DHEI, packets are expected at a given rate. Staging processor 107 may be configured to monitor for the frequency in which such packets are received to determine whether a transmission failure has occurred. In addition, in an embodiment of the invention, the packet ID for incoming packets may be read by staging processor 107 to determine whether such packets are being received sequentially or whether the order of receiving such packets have been disturbed. Using one of the monitoring methods described above, an alarm is generated upon detecting a delay or omission with respect to frame, packet or PMT reference delivery—apart from whether there is a time delay in programming content transmission.

Segmenting Scrambled Content

Typically, the programming content that is received by headend 22 from sources 12 is transmitted in a scrambled format. The scrambled content is then stored on one or more servers 190-1 through 190-N for further transmission downstream to one or more terminals 18-1 through 18-M upon request by a user. By storing and transmitting scrambled content, security considerations are typically met since intercepting and copying the program material becomes more difficult as compared with content that is not scrambled.

Although scrambled programming content tends to be more secure, it also tends to be less adaptable. For example, applying segmentation messages to scrambled content can be more difficult than applying such messages to descrambled programming content. In accordance with an embodiment of the invention, staging processor 107 may nevertheless be configured to segment scrambled content. This is accomplished by, in one embodiment, utilizing a descrambled copy of the scrambled content as a guide to facilitate scrambled programming content processing.

Figure 6A:
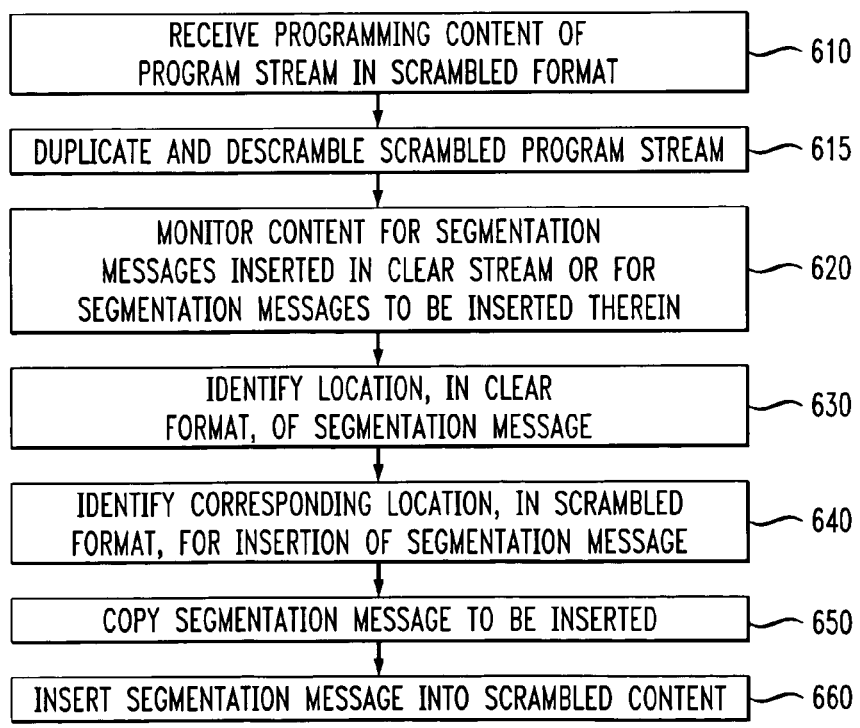
FIG. 6a is a flowchart illustrating the process of segmenting scrambled programming content, in accordance with an embodiment of the invention.

For example, referring to FIG. 6a, staging processor 107 of headend 22 receives a transport stream from, for example, origination system 20 that contains programming content in a scrambled format (step 610). A portion of such transport stream, denoted 6000, is illustrated in FIG. 6b.

Program stream 6000' includes a portion of a B-frame (frame $B_{021002}$), and a portion of another B-frame (frame $B_{023110'}$) and an I-frame (frame $I_{01019'}$) in between the illustrated B-frame portions. Each of these frames are made up of packets. Thus, for example, I-frame $I_{01019'}$ comprises packets 6100', 6101', 6102', 6103', 6104'6105', etc. As shown with respect to packet 6100', for example, each packet comprises a trailer 6100a', a payload 6100b' and a header 6100c'. The header contains instructions about the data carried by the packet and includes: the length of the packet; synchronization data that assists with the matching of the packet with system 14; packet number which identifies a given packet, e.g. packet 6100', within the sequence of packets; the protocol which defines the type of packet that is being transmitted; a destination address which identifies the destination of packet 6100'; and an originating address which identifies the origination of packet 6100'.

Trailer 6100a' includes information indicating the end of the packet 6100'.

Payload 6100b' comprises the content that is being carried and includes, among other things, a portion of the data that makes up I-frame $I_{01019'}$.

The scrambled programming content is duplicated and corresponding descrambled programming content is generated by a conventional descrambling technique (step 615). Along with the programming content received by staging processor 107, the program stream containing such content may, in accordance with an embodiment of the invention, also include segmentation messages that are to be inserted in the scrambled programming content.

At step 620, staging processor CPU 23 monitors the incoming program stream for segmentation points in the program stream (i.e., points in the stream to perform the insertion).

Upon identifying a segmentation message, staging processor CPU 23 identifies the location, within the descrambled programming content, that the received segmentation message is situated (if the segmentation message is already inserted in the program stream when the program stream is received) or is to be inserted (if the segmentation message is received separately from the program stream) (step 630). At step 640, staging processor CPU 23 then identifies the corresponding location, within the scrambled programming content, in which the segmentation message should be inserted. Thus, in effect, the descrambled programming content is used by staging processor 107 as a guide to identify the appropriate corresponding location for inserting a received segmentation message within the scrambled programming content.

In accordance with an embodiment of the invention, the descrambled programming content having segmentation messages inserted therein by CPU 23 may be used as a guide for the insertion of segmentation messages in a scrambled program stream by counting the number of received packets respecting the descrambled programming content from a predetermined starting point and the number of packets from the corresponding starting point of the scrambled programming content.

It should be noted that, although the payload portion of a packet in the scrambled programming content is scrambled (as indicated by the shaded boxes of FIG. 6b), the trailer and header is descrambled. Thus, corresponding starting points between the descrambled and scrambled programming content may be identified by comparing the header of the descrambled content with the header of a corresponding packet associated with the descrambled programming content. Because each header contains a unique identifier, identifying the corresponding header for the duplicate stream—that is descrambled—may be effectuated. Thus, referring back to FIG. 6b, program stream 6000' illustrates a stream of packets (packets 6100', 6101', 6102', 6103', 6104', 6105, etc.) in which the payload is scrambled (such as payload 6100b'), which corresponds and is aligned with program stream 6000 (having packets 6100, 6101, 6102, 6103, 6104, 6105, etc.) wherein, for example, packet 6100 is completely descrambled, including trailer 6100a, header 6100c, as well as payload 6100b. By identifying a correspondence between headers 6100 and 6100', for example, staging processor CPU 23 can align the program streams for segmentation.

In another embodiment of the invention, the correspondence between scrambled programming and descrambled programming content may be determined by CPU 23 utilizing the well known program clock record (PCR) provided in a packet's transport header adaptation field within the packets' header, as such information within the header is maintained descrambled. The PCR is a record that serves as a clock for the transmitted program stream. Thus, by identifying the PCR time value of a predetermined descrambled packet within the scrambled programming content, the corresponding descrambled programming content may be identified.

Once the segmentation point is identified in the scrambled program stream, staging processor 107 is able to insert segmentation messages into the scrambled content as desired.

Compensation for Delay in Transmission to Staging Processor

In accordance with an embodiment of the invention, staging processor 107 can compensate for a delay in transmission of programming content to processor 107. A delay may arise for several reasons including data missing from a transmission due to a temporary transmission failure from origination system 20 to headend 22, delay at the input of staging processor 107, and the like.

Figure 7:
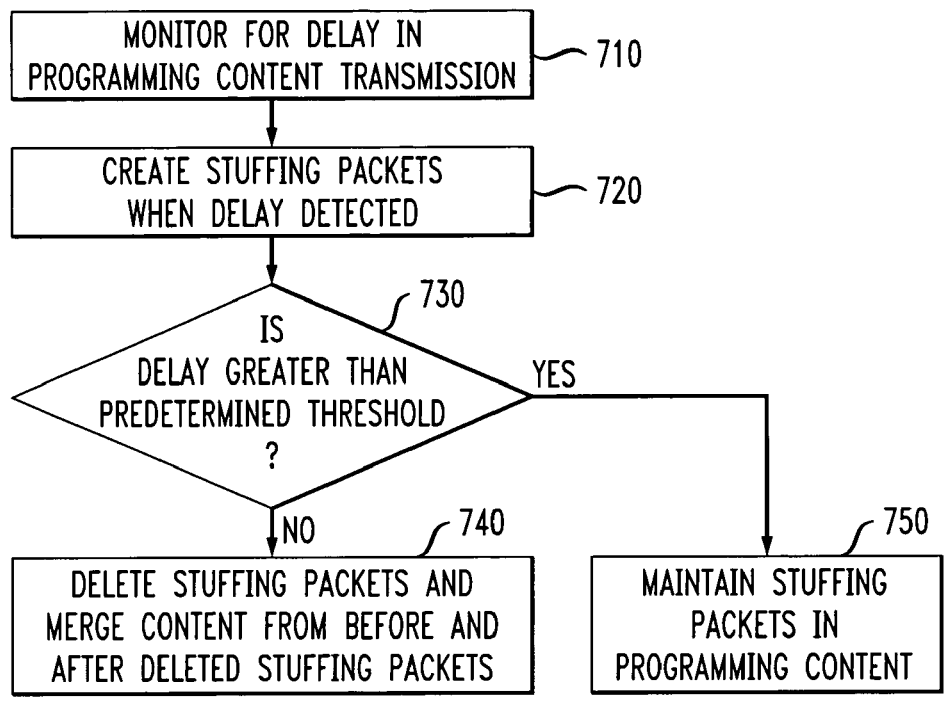
FIG. 7 is a flowchart illustrating the process of compensating for missing or delayed programming content, in accordance with an aspect of the invention.

FIG. 7 is a flowchart illustrating the process of compensating for missing or delayed programming content, in accordance with an aspect of the invention. As described above, by monitoring the reception of arriving MPEG-2 data packets, segmentation messages, etc. (or the lack thereof), staging processor 107 itself can monitor for whether there is a delay in transmission of programming content (step 710). Upon detecting a delay in the delivery of programming content, staging processor 107 creates, in an embodiment of the invention, stuffing packets to fill in the content that is not received in a timely fashion or at all (step 720). Thus, these stuffing packets are, in one embodiment, packets that carry no useful data but are used to maintain a constant bit rate with a variable payload. By carrying stuffing bits, code words are inserted in a program stream and are then discarded, thereby maintaining the bit rate of the stream. In another embodiment of the invention null packets (i.e., packets that have header information but no payload) are used to fill in the content that is not received.

In accordance with an embodiment of the invention, when such a feature is activated, staging processor 107 may be configured to buffer a predetermined amount of a received program stream. If upon monitoring the received segmentation messages, staging processor CPU 23 determines that a portion of the program stream is delayed, interrupted or skipped, staging processor CPU 23 generates stuffing packets to fill in the missing content.

In accordance with one embodiment of the invention, if the delay is less than a predetermined amount of time, the inserted stuffing packets may be deleted from the program stream, prior to further transmission to, for example, video servers 190-1 through 190-N or set-top terminals 18-1 through 18-M. Thus, for example, when a small delay occurs (e.g., a 500 millisecond delay) (step 730), the stuffing packets that were inserted into the stream as a result of the detected delay may be deleted and the received programming content from both before and after the delay may be merged (step 740). In such circumstances, the delay in transmission is not noticeable to the user as the delay in transmission was sufficiently brief such that the programming content prior to and after the delay were pieced together prior to downstream transmission from headend 22 to set-top terminal 18-1. If the delay exceeds the predetermined amount of time, the provision of the stuffing packets is effectuated (step 750), which enables a more graceful failure of content delivery when a delay in receiving data that makes up a program stream occurs.

In another embodiment of the invention, other packets (besides, e.g., null packets) may be used to create an image that is sent to terminal 18-1, and viewed by users—in the form of a blank (or black) screen, a stationary image (such as a picture), or a pre-packaged audio and/or video clip. In yet another embodiment of the invention, when a delay is recognized, one of the I-frames that is received before the delay may be repeated to compensate for such delay.

Encapsulating MPEG-2 Formatted Transport Streams into UDP/IP Datagrams

As described above, the generated transport streams are typically transmitted from headend 22 to hub 24 via IP transport over optical fiber. Content received by staging processor 107, however, may also be repackaged, or encapsulated, in a user datagram protocol/Internet protocol ("UDP/IP") datagram. Employing such datagrams typically reduces the processing time to reassemble associated packets of a given program as compared with using other standard protocols, such as the Internet protocol.

Video and audio data which is compressed in accordance with, for example, the well known MPEG-2 standard, and which comprises the programming content information received and handled by staging processor 107, are carried by continuous elementary streams, respectively, which are packetized, resulting in packetized elementary streams (PESs). Staging processor 107 identifies these packets by headers that contain time stamps for synchronization, and are used to form MPEG-2 formatted transport streams. For digital broadcasting, multiple programs and their associated PESs are multiplexed into a transport stream carrying a single program. A transport stream has PES packets further subdivided into short fixed-size data packets, in which multiple programs encoded with different clocks can be carried. A transport stream not only comprises a multiplex of audio and video PESs, but also other data such as MPEG-2 program specific information ("PSI") describing the transport stream. The MPEG-2 PSI includes a program associated table ("PAT") that lists every program in the transport stream. Each entry in the PAT points to a program map table (PMT) that lists the elementary streams making up each program. Some programs are open, but some programs may be subject to conditional access (encryption) and this information is also carried in the MPEG-2 PSI.

The aforementioned fixed-size data packets in a transport stream each carry a packet identifier ("PID") code. Packets in the same elementary streams all have the same PID, so that a decoder can select the elementary stream(s) it needs and reject the remainder. Packet-continuity counts are implemented to identify discontinuity in the desired stream.

In accordance with an embodiment of the invention, because generated transport streams are transmitted via Internet Protocol ("IP")—e.g., from headend 22 to hub 24—the transmitted data may be encapsulated using a user datagram protocol ("UDP"). Such a protocol is transaction oriented, and delivery and duplicate protection may not be guaranteed. Nevertheless, such protocol provides a procedure for sending content with a minimum of protocol mechanisms. It should be noted that TCP/IP can also be used to deliver data if content is being distributed across a wired network.

The user datagram—which in this case carries video content and audio content information—is typically made up of four fields which reside in a packet header (in addition to the data field that stores the transmitted data). A source port field is an optional field for storing a port value which indicates the port of the sending processor. If this field is not used, a value of zero is inserted. A destination port identifies the address to which the packet of data should be transmitted. A length field indicates the length in octets of the datagram including the header and the data. A checksum field provides protection against corrupted datagrams.

UDP provides a connectionless service that utilizes the IP protocol to send the datagram. Unlike certain other protocols that deliver IP packets (such as the Transmission Control Protocol (TCP)), UDP does not provide sequencing of packets, relying on the higher layer protocols to sort information. Using UDP often reduces processing time because of minimal reassembly time—particularly when the datagrams are small.

As described above, when staging processor 107 receives programming content, it is typically received in accordance with the DVB-ASI or DHEI standards. Such standards support serial point-to-point transport of programming materials. By encapsulating programming content as a UDP/IP datagram, a multicast IP header may be used, thereby directing datagrams to multiple devices, such as any number of video servers 190-1 through 190-N. Accordingly, such a protocol allows simultaneous or almost simultaneous delivery of received programming content to multiple processing devices, thereby creating an IP multicast.

The IP multicast operates based on a group concept. For example, a group of servers, such as video servers 190-1 through 190-N, may be configured to receive a particular data stream or substream using a well known Internet Group management Protocol (IGMP). Such configuration enables these servers to be aware of IP multicast packets with a particular destination address to which staging processor 107 can send the data stream. When packets are transmitted to the staging processor's output ports 109-1 through 109-N, the video servers 190-1 through 190-N read them based on their destination address, which is a so-called "Class D address." Specifically, each IP packet whose destination address starts with a certain value, for example "1110" is an IP multicast packet. The remaining bits of a packet address may be used for identifying the group of servers for which the packet is intended.

When one or more of servers 190-1 through 190-N are configured to receive IP multicast packets and when IP multicast packets are made available to these servers, a processor (not shown) in each such server determines whether it is configured to read the received packets based upon IP multicast packet's address.

Figure 8:
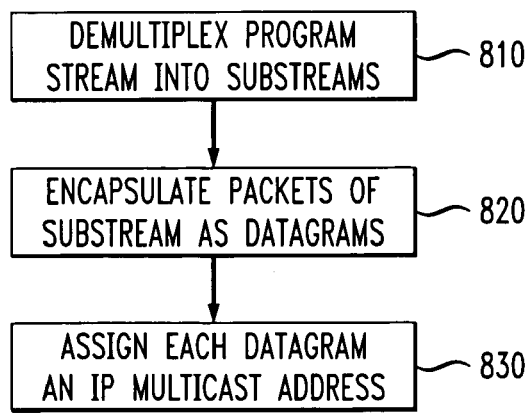
FIG. 8 is a flowchart illustrating the process of encapsulating contents of a program stream as a UDP/IP datagram, in accordance with an embodiment of the invention.

Thus, referring to FIG. 8, the process for formatting programming content that is received in a program stream by headend 22, in accordance with an embodiment of the invention, is illustrated. At step 810, upon receiving programming content in a DVB-ASI format, DHEI format, or some other serial point-to point format, staging processor CPU 23 demultiplexes the program stream into substreams by, for example, specific program. This is accomplished as a result of CPU 23 reading the program identifier for each received packet and assigning packets having common program identifiers to their own substream (as described more fully above). Each packet in each respective substream is then encapsulated as a datagram (step 820) by staging processor 23 and each UDP datagram is assigned by CPU 23 an IP multicast address (e.g., Class D address) (step 830). The Class D address is read by servers 190-1 through 190-N for determining which of these servers the packet is intended. As a result, a substream is created which is carrying content relating to, in this example, a single program.

Thus, one or more of video servers 190-1 through 190-N reads the data packets for which an IP multicast is established and may store such packets for storage. Accordingly, transmission of such programming content requires a relatively small amount of processing as the programming content is encapsulated in its own substream and supports a multicast transmission.

By employing a UDP/IP protocol (as opposed to, for example, the TCP/IP protocol), the scalability of staging processor 107 increases. In other words, if one of such processor 107 goes out of service, system 14 can access another staging processor that is made available to system 14. The increased scalability also allows load-balancing among available staging processors. Accordingly, the implementation of the UDP/IP protocol obviates the need to replicate the transmitted content stream when such redundancy is required or load balancing is desired. Thus, an assigned port value can be used by staging processor 107 to forward datagrams to other staging processors (not shown) for sharing in the processing of received programming content that is repackaged in the datagrams.

The foregoing merely illustrates the principles of the invention. It will thus be appreciated that those skilled in the art will be able to devise numerous other arrangements which embody the principles of the invention and thus within the spirit and scope of the invention, which is defined in the claims, below.

Figure 9:
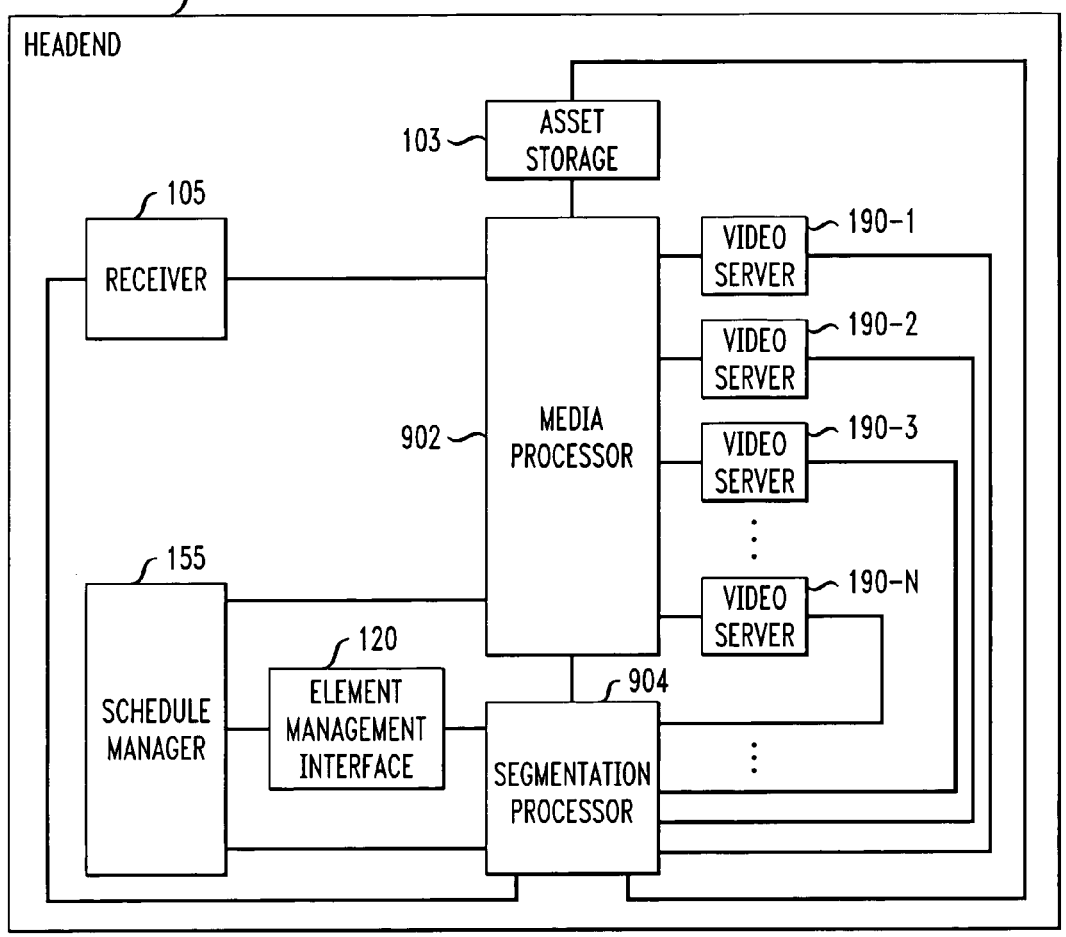
FIG. 9 is a block diagram of certain components of the headend embodied by the broadband communications system of FIG. 1a, in accordance with another embodiment of the invention.

For example, staging processor 107 is described above as affording both media processing and content segmentation capabilities. Such a configuration is illustrated in FIG. 1B as a monolithic device—i.e., such dual functionality is contained within a single physical embodiment. In another embodiment, the media processing functionality is separated from the segmentation control processing, including segmentation message detection and segmentation and file transfer. Thus, turning to FIG. 9, headend 22a is illustrated having the same components and functionality as that of headend 22 of FIG. 1b, except that staging processor 107 of FIG. 1b is replaced by media processor 902 and segmentation processor 904, wherein these components are connected to one another and other components of headend 22a by Ethernet connections.

Figure 10:
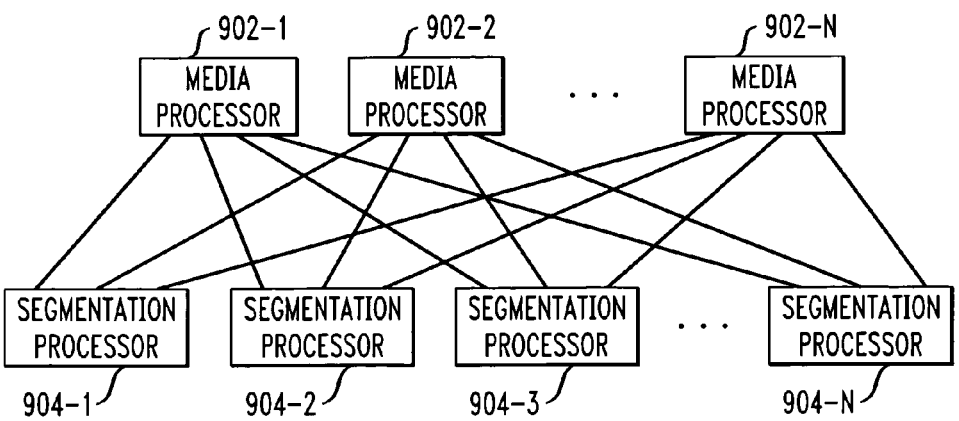
FIG. 10 is a block diagram illustrating the configuration of multiple media processors and multiple segmentation processors utilized by the broadband communications system of FIG. 1a, in accordance with an embodiment of the invention.

In yet an alternate embodiment, multiple media processors 902-1 through 902-Q, where Q is an integer, and multiple segmentation processors 904-1 through 904-R, where R is an integer, are utilized, and are interconnected by, for example, Ethernet connections. Such an arrangement allows for effective load-balancing, redundancy and back-up arrangements. It should be noted that, although in FIG. 10 each of the media processors are connected to each of the segmentation processors, a configuration may be implemented wherein each media processor is connected to at least one segmentation processor, but not necessarily all of them.

What is claimed is:

1. A method for processing a program stream, comprising:
receiving a program stream, a segment of the program stream comprising a first total number of frames, the first total number of frames comprising at least one intracoded frame and at least one interframe, the program stream further comprising at least one segmentation message containing instructions for processing the program stream at a location in the segment defined by the at least one segmentation message;
constructing at least one additional intracoded frame, at least in part, from content of at least one of the first total number of frames in the segment of the received program stream;
inserting the at least one additional constructed intracoded frame at the defined location in the segment, increasing the first total number of frames in the segment to a second total number of frames greater than the first total number of frames; and
after inserting the at least one additional intracoded frame, processing the program stream at the defined location pursuant to the instructions.

2. The method of claim 1, wherein the first total number of frames in the segment comprises a plurality of interframes.

3. The method of claim 2, further comprising reformatting at least one of the interframes following an inserted additional intracoded frame in the segment, prior to processing the program stream at the defined location.

4. A system for processing a program stream, comprising:
an interface for receiving a program stream, a segment of the program stream comprising a first total number of frames, the first total number of frames comprising at least one intracoded frame and at least one interframe, the program stream further comprising at least one segmentation message containing instructions for processing the program stream at a defined location in the program stream; and, at least one processor for:
constructing at least one additional intracoded frame, at least in part, from content of at least one of the first total number of frames in the segment of the received program stream;
inserting the at least one additional constructed frame at the defined location in the segment, increasing the first total number of frames in the segment to a second total number of frames greater than the first total number of frames; and
processing the program stream at the defined location pursuant to the instructions, after inserting the at least one additional constructed intracoded frame.

5. The system according to claim 4, wherein the first total number of frames in the segment comprises a plurality of interframes.

6. The system according to claim 5, further comprising reformatting at least one of the interframes following an inserted additional intracoded frame in the segment, prior to processing the program stream at the defined location.

7. The method of claim 1, comprising constructing the at least one additional intracoded frame from content of at least one interframe proximate the defined location in the segment.

8. The system of claim 4, comprising constructing the at least one additional intracoded frame from content of at least one interframe proximate the defined location in the segment.

9. A system for processing a program stream, comprising:
means for receiving a program stream, a segment of the program stream comprising a first total number of frames, the first total number of frames comprising at least one intracoded frame and at least one interframe, the program stream further comprising at least one segmentation message containing instructions for processing the program stream at a location defined by the at least one segmentation message;
means for constructing at least one additional intracoded frame, at least in part, from content of at least one of the first total number of frames in the segment of the received program stream;
means for inserting the at least one additional constructed intracoded frame at the defined location in the segment of the program stream, increasing the first total number of frames in the segment to a second total number of frames greater than the first total number of frames; and
means for processing the program stream at the defined location pursuant to the instructions, after inserting the at least one additional constructed intracoded frame.

10. A method for processing a program stream comprising:
receiving an encoded program stream comprising a plurality of groups of pictures ("GOPs"), each GOP comprising a first total number of frames, the first total number of frames comprising at least one intracoded frame and a plurality of interframes, the program stream further comprising at least one segmentation message containing instructions for processing the program stream at a location within a respective GOP defined by the at least one segmentation message;
constructing at least one additional intracoded frame, at least in part, from content of at least one of the first total number of frames in the GOP;
inserting the at least one additional constructed intracoded frame at the defined location within the respective GOP, such that the respective GOP comprises a second total number of frames greater than the first total number of frames;

reformatting at least one interframe following the inserted additional intracoded frame in the respective GOP based, at least in part, on the inserted additional intracoded frame; and
processing the program stream at the defined location pursuant to the instructions, after reformatting the at least one interframe.

11. The method of claim 10, further comprising:
reformatting at least one second interframe within the GOP following the inserted additional constructed intracoded frame based, at least in part, on the at least one reformatted interframe, prior to processing the program stream at the defined location.

12. The method of claim 1, wherein the receiving, constructing, inserting, and processing are conducted by at least one processor in a headend of a cable television system.

13. The system of claim 4, further comprising a headend of a cable television system, the headend comprising the interface and the processor.

14. The method of claim 10, wherein the receiving, constructing, inserting, reformatting, and processing are conducted by at least one processor in a headend of a cable television system.

15. The method of claim 10, comprising constructing the additional intracoded frame, at least in part, from content of an intracoded frame preceding the location.

16. The method of claim 15, comprising constructing the additional intracoded frame, at least in part, from content of at least one interframe following the defined location.

17. The method of claim 10, further comprising requantizing the at least one reformatted interframe.

18. The method of claim 1, wherein the segment comprises a group of pictures (GOP).

19. The method of claim 1, further comprising:
determining whether to increase temporal resolution in the segment, and if so, then constructing the at least one additional reference frame.

20. The method of claim 1, comprising constructing the additional intracoded frame, at least in part, from content of at least one interframe preceding the defined location.

21. The method of claim 20, comprising constructing the additional intracoded frame, at least in part, from content of at least one interframe following the defined location.

22. The method of claim 3, further comprising:
requantizing the reformatted interframes.

23. The system of claim 4, wherein the segment comprises a group of pictures (GOP).

24. The system of claim 4, wherein the processor further:
determines whether to increase temporal resolution in the segment and, if so, then constructs the at least one additional reference frame.

25. The system of claim 4, comprising constructing the additional intracoded frame, at least in part, from content of at least one interframe preceding the defined location.

26. The system of claim 25, comprising constructing the additional intracoded frame, at least in part, from content of at least one interframe following the defined location.

27. The system of claim 6, further comprising:
requantizing the reformatted interframes.

28. A method for processing a program stream, comprising:
receiving a program stream comprising a plurality of intracoded frames and a plurality of interframes;
creating at least one additional intracoded frame at a defined location in the program stream;
reformatting at least one interframe following the created additional intracoded frame in the program stream; and processing at least a portion of the program stream including the defined location, after reformatting the at least one interframe.

29. The method of claim 28, comprising:
processing at least the portion of the program stream by creating a fast-forward file and a rewind file based, at least in part, on at least the portion of the program stream.

30. The method of claim 28, wherein the program stream comprises at least one segmentation message containing instructions for processing the program stream at the defined location.

31. The method of claim 28, further comprising:
reformatting at least one additional interframe following the defined location based, at least in part, on at least one reformatted interframe.

32. The method of claim 28, further comprising:
requantizing the at least one reformatted interframe.

33. The method of claim 28, further comprising:
determining whether to increase temporal resolution in the segment, and if so, then creating the at least one additional reference frame at the defined location.

34. A system for processing a program stream, comprising:
an interface for receiving a program stream comprising a plurality of intracoded frame and a plurality of interframes; and
at least one processor for:
creating at least one additional intracoded frame at a defined location in the program stream;
reformatting at least one interframe following the created additional intracoded frame in the program stream; and
processing at least a portion of the program stream including the defined location, after reformatting the at least one interframe.

35. The system of claim 34, wherein the processor processes the program stream by creating a fast-forward file and a rewind file based, at least in part, on the portion of the program stream.

36. The system of claim 34, wherein the program stream comprises at least one segmentation message containing instructions for processing the program stream at the defined location.

37. The system of claim 34, wherein the processor further reformats at least one interframe following the defined location based, at least in part, on at least one reformatted interframe.

38. The system of claim 34, wherein the processor further requantizes the at least one reformatted interframe.

39. The system of claim 34, wherein the processor further determines whether to increase temporal resolution in the segment, and if so, then the processor creates the at least one additional reference frame at the defined location.

* * * * *